US008557213B2

(12) United States Patent
Ando et al.

(10) Patent No.: US 8,557,213 B2
(45) Date of Patent: Oct. 15, 2013

(54) CARBON NANOTUBES, SUBSTRATE AND ELECTRON EMISSION DEVICE WITH SUCH CARBON NANOTUBES AND CARBON NANOTUBE SYNTHESIZING SUBSTRATE AS WELL AS METHODS OF AND APPARATUS FOR MAKING THEM

(75) Inventors: Toshihiro Ando, Tsukuba (JP); Kiyoharu Nakagawa, Tsukuba (JP); Mika Gamo, Tsukuba (JP); Hidenori Gamo, Taito-ku (JP)

(73) Assignees: National Institute for Materials Science, Ibaraki (JP); Toppan Printing Co., Ltd., Tokyo (JP)

( * ) Notice: Subject to any disclaimer, the term of this patent is extended or adjusted under 35 U.S.C. 154(b) by 895 days.

(21) Appl. No.: 12/095,015
(22) PCT Filed: Nov. 24, 2006
(86) PCT No.: PCT/JP2006/323501
§ 371 (c)(1),
(2), (4) Date: Feb. 4, 2010
(87) PCT Pub. No.: WO2007/061078
PCT Pub. Date: May 31, 2007

(65) Prior Publication Data
US 2010/0171409 A1    Jul. 8, 2010

(30) Foreign Application Priority Data

Nov. 25, 2005  (JP) .................. 2005-341181
Mar. 14, 2006  (JP) .................. 2006-070030
Mar. 14, 2006  (JP) .................. 2006-070031
Aug. 28, 2006  (JP) .................. 2006-231314

(51) Int. Cl.
| | | |
|---|---|---|
| D01F 9/12 | (2006.01) | |
| H01J 1/02 | (2006.01) | |
| B32B 7/00 | (2006.01) | |
| B32B 9/00 | (2006.01) | |
| B32B 17/06 | (2006.01) | |
| B32B 15/04 | (2006.01) | |
| B32B 5/16 | (2006.01) | |
| B05D 3/02 | (2006.01) | |
| C25D 9/04 | (2006.01) | |
| C25D 17/00 | (2006.01) | |

(52) U.S. Cl.
USPC ........ 423/447.1; 313/311; 428/119; 428/702; 428/469; 428/408; 428/428; 428/450; 428/328; 427/372.2; 205/316; 204/198; 977/844; 977/939

(58) Field of Classification Search
USPC ........ 423/447.1–447.3, 445 B; 977/742–754, 977/842–848, 939; 428/367, 119, 328, 408, 428/428, 450, 469, 702; 313/311; 204/198; 205/316
See application file for complete search history.

(56) References Cited

U.S. PATENT DOCUMENTS

| 6,758,957 B1 * | 7/2004 | Zhou et al. .................. 205/109 |
| 2004/0151653 A1 * | 8/2004 | Ando et al. ................. 423/447.1 |
| 2004/0241077 A1 * | 12/2004 | Ryzhkov ................... 423/445 R |

FOREIGN PATENT DOCUMENTS

| CN | 1520381 A | 8/2004 |
| JP | 2002-37614 A | 2/2002 |

(Continued)

OTHER PUBLICATIONS

Zhang, et al., Liquid phase synthesis of carbon nanotubes, Physica B 2002; 323: 293-295.*

(Continued)

*Primary Examiner* — Daniel C McCracken
(74) *Attorney, Agent, or Firm* — Chen Yoshimura LLP

(57) ABSTRACT

A novel carbon nanotube (64) is featured in that it has the highest Raman scattering intensity in the vicinity of 1580 cm$^{-1}$ in its Raman spectrum. Carbon nanotubes can be grown on and from the catalytic fine particles (63) which consist of ultra-fine particles of cobalt oxide catalyst onto a substrate comprising a conductive substrate (62) and fine particles (63) of catalyst formed on a surface thereof. An electron emission device (60) so configured as to emit electrons by applying a voltage to apical ends (64*a*) of such carbon nanotubes (64) can be reduced in driving voltage and can achieve a current such as to emit a fluorescent material on the market for low-velocity electron beams. The electron emission device (60) needs no gate and can thus simplify the structure and reduce the cost of a surface light-emitting device for which the element is used. The carbon material remains unoxidized even in a low vacuum and thus allows realizing a light emitting device that can be paneled more easily, and is longer in operating life than those using a conventional electron emission device.

4 Claims, 18 Drawing Sheets

(56) References Cited

FOREIGN PATENT DOCUMENTS

| | | |
|---|---|---|
| JP | 2003-12312 A | 1/2003 |
| JP | 2004-292216 A | 10/2004 |
| JP | 2004-327085 A | 11/2004 |
| JP | 2005-35800 A | 2/2005 |
| JP | 2005-213567 A | 8/2005 |
| JP | 2005-314161 A | 11/2005 |
| JP | 2005-314162 A | 11/2005 |
| TW | 200503948 A | 2/2005 |
| TW | 200518157 A | 6/2005 |
| TW | 200519224 A | 6/2005 |
| TW | 200600452 A | 1/2006 |
| TW | 200607757 A | 3/2006 |
| WO | 03/000590 A1 | 1/2003 |

OTHER PUBLICATIONS

Zhang, et al., A Novel Synthesis Method for Aligned Carbon Nanotubes in Organic Liquids, Jpn. J. Appl. Phys. 2002; 41: L408-L411.*

PCT/IPEA/409 in PCT/JP2006/323501.

Applicants arguments filed in submitting Article 34 Amendments in PCT/JP2006/323501 and its English language translation.

Saito et al. "Carbon Nano Tube no Kiso to Oyo", Mar. 31, 2004, pp. 110-112, Baifukan, Japan.

Toshihiro Ando, "Diamond Hyomen no Kagaku Shushoku to Ekisoho Nano Tube Gosei, Tan'itsu Bunshi Genshi Level no Hanno Seigyo", 2002, pp. 51-54, Theme-betsu Symposium 2 Butsuri Kagaku no Saizensen Nano Zairyo Sosei no Impact, Japan.

Shibasaki et al. "Koeki Kaimen Sesshoku Bunkaiho ni yoru Carbon Nano Tube no Gosei-Cobalt shokubai no Butsuri Kagaku Jotai to Seiseibutsu no Kankei", 2005, pp. 158-159, The Surface Finishing Society of Japan Dai 112 Kai Koen Taikai Koen Yoshishu, Japan.

National Institute of Advanced Industrial Science and Technology, Research Center for Nanocarbon, "Dream Expanding New Materials", May 25, 2004, pp. 155-157, p. 198 Maruzen Co., Ltd. Tokyo, Japan.

International Search Report (ISR) for PCT/JP2006/323501.

PCT/ISA/237 in PCT/JP2006/323501 and its translation of Section V.

* cited by examiner (a)

(b)

(a)

(b)

Thermal oxidation in air (P1: 2P$_{3/2}$, P2: 2P$_{1/2}$)

(a) 13 / 33

(b) 14 / 33

(c)

(d)

(a)

(b)

(a)

(b)

(a)

(b)

CARBON NANOTUBES, SUBSTRATE AND ELECTRON EMISSION DEVICE WITH SUCH CARBON NANOTUBES AND CARBON NANOTUBE SYNTHESIZING SUBSTRATE AS WELL AS METHODS OF AND APPARATUS FOR MAKING THEM

TECHNICAL FIELD

The present invention relates to a substrate and an electron emission device provided with carbon nanotubes which are densely aligned and highly oriented, and a substrate on which to synthesize the carbon nanotubes as well as methods of and apparatus for making them. More specifically, the present invention relates to a substrate with carbon nanotubes, methods of synthesizing carbon nanotubes suitable for synthesizing said substrate with carbon nanotubes, apparatus for making carbon nanotubes, a substrate on which to synthesize the carbon nanotubes, methods of making a substrate on which to synthesize the carbon nanotubes and an electron emission device using the substrate with carbon nanotubes.

BACKGROUND ART

In a conventional micro fabricated electron emission device, metals, silicon and their compounds as for materials of the device have been used. Such a material on its uppermost surface as the electron emission face becomes easily oxidized in air, forming an oxide in which work function is high and has made the electron emission device with high work function. Also, an oxide such as of metal or silicon by its insulating nature is hard to emit electrons.

On the other hand, if a nanocarbon material such as carbon nanotubes having a size in the order of nanometers (nm) is utilized, there can be no surface oxidation, avoiding a rise in work function. Further, the nanocarbon material has a high conductivity and also has a high thermal conductivity. Therefore, it can readily emit electrons and its failure by Joule heat can be prevented.

By the way, many attempts have been made to use nanocarbon material as the material for electron emission devices. As is well known, however, many conventional nanocarbon materials made by utilizing plasma contain a lot of impurity components such as amorphous substances and there has been no method that can reproducibly make highly aligned carbon nanotubes especially suitable to emit electrons uniformly.

Since carbon nanotubes have an extremely small radius of curvature at their apical ends and are a material extremely stable mechanically and chemically for use in electron emission device, use in an electrode of a double layer capacitor as they have graphite edges at high density and use in an electrode of a fuel cell as they can adsorb and emit ions at high density, investigations have been advanced to put carbon nanotubes to practical use.

By the way, if used in an electron emission device, an double layer capacitance electrode or a fuel cell electrode, carbon nanotubes are used in a bundle in which they are aligned unidirectionally and at high density and namely as high-density and highly oriented carbon nanotubes. It is evident that their performances are enhanced as their density and orientation are increased. To wit, the higher the density and orientation, the higher the electron emission efficiency per unit area for the electron emission device and the larger the output of power storage or generation per unit area for the double layer capacitor or fuel cell electrode. Consequently, densely aligned and highly oriented carbon nanotubes that are much higher in density and orientation are being needed.

Since carbon nanotubes are a nano material having a radius in the order of nanometers, it is impossible to synthesize carbon nanotubes randomly aligned and then to mechanically orient the individual carbon nanotubes and align them densely. Accordingly, in making densely aligned and highly oriented carbon nanotubes, a synthesizing method that carbon nanotubes are automatically aligned onto the substrate has been used. As one of such methods, there is known a method of synthesizing densely aligned and highly oriented carbon nanotubes by heating a substrate carrying a metal catalyst in an organic liquid (See Patent Reference 1.). This method, which is based on a peculiar interfacial cracking reaction that occurs when a solid substrate and an organic liquid contact having a high temperature difference, is called solid-liquid interfacial contact cracking in organic liquid. This method, which is based on a peculiar interfacial cracking reaction that occurs when a solid substrate and an organic liquid contact each other having a high temperature difference, is called solid-liquid interfacial contact cracking in organic liquid. According to this method, the highly pure carbon nanotubes can be synthesized without forming an impurity such as amorphous carbon as in arc discharge and chemical vapor deposition methods (See Non-patent Reference 1.).

The method according to Patent Reference 1 is mentioned referring to FIG. 18. The Figure shows a synthesis apparatus using the solid-liquid interfacial contact cracking method. The synthesis apparatus comprises a liquid tank 31 retaining an organic liquid 30 such as methanol, a water cooling means 32 provided to surround the outside of the liquid tank 31 for maintaining the organic liquid 30 at a temperature under its boiling point, a substrate holder 35 supporting a conductive substrate 33 and having an electrode 34 for flowing an electric current through the substrate 33, a condensing means 37 comprising a water cooling pipe 36 that cools and condenses a vapor of the organic liquid from the liquid tank 31 to return the condensate to the liquid tank 31, a $N_2$ gas inlet valve 38 through which $N_2$ gas is introduced to prevent the organic liquid vapor and air from contacting each other, and a cover 39 for sealing the liquid tank 31.

To perform the solid-liquid interfacial contact cracking in the organic liquid with the synthesis apparatus above, a thin film of metal catalyst of a transition metal such as Fe, Co or Ni is layered on a silicon or diamond substrate and the substrate is exposed to hydrogen plasma to cause the substrate to carry fine particles of the metal catalyst densely distributed thereon. This substrate 33 is held by the substrate holder 35 and an electrical current is flown through the substrate 33 via the substrate holder 35 to heat the substrate 33. This causes carbon nanotubes to be synthesized and built on the fine particles of metal catalyst by a peculiar interfacial cracking reaction brought about when the substrate 33 and the organic liquid 30 come into contact with each other having a severe temperature difference. According to this method, carbon nanotubes which are highly oriented perpendicular to the substrate and densely aligned can be synthesized wherein making the thin film of metal catalyst thinner allows the fine particles of metal catalyst to be finer in particle size and more densely distributed. As shown in FIGS. 19(a) and 19(b), densely aligned and highly oriented carbon nanotubes having a radius of about 20 nm and aligned at a density of 300 tubes/$\mu m^2$ perpendicular to the substrate can thus be synthesized.

Patent Reference 1: Japanese patent laid open application, JP 2003-12312 A
Patent Reference 2: Japanese patent laid open application, JP 2004-327085 A
Non-patent Reference 1: National Institute of Advanced Industrial Science and Technology, Research Center for Nanocarbon editing: Corporation's Series Nanocarbon Materials "Dream Expanding New Materials" (in Japanese), May 25, 2004, published by Maruzen Co., Ltd. pp. 155-157, p. 198, and Table 2

DISCLOSURE OF THE INVENTION

Problems to be Solved by the Invention

However, the conventional solid-liquid interfacial contact cracking method fails to produce carbon nanotubes which are sufficient in their crystal quality and with good reproducibility on their orientation. For this reason, it has the problem that it fails to realize an electron emission device which makes the best use of the excellent properties peculiar to carbon nanotubes.

Specifically, this method under identical conditions for manufacture such as thickness of a metal catalyst thin film, hydrogen plasma conditions, rate of temperature rise and heating temperature of a substrate in an organic liquid does not necessarily result in the synthesis of oriented and densely aligned carbon nanotubes which are identical in density and orientation, but those which are thicker and thinner than about 20 nm in radius and at a density lower than about 300 tubes/μm. In fact, it is only at one of ten times that highly evenly oriented and aligned carbon nanotubes with a desired radius and at a density are obtained, posing the problem that reproducibility is poor.

The cause for poor reproducibility is considered to be due to such as the fact that when a substrate on which a thin film of metal catalyst of a transition metal such as Fe, Co or Ni is applied is exposed to hydrogen plasma, forming fine particles of metal catalyst on the substrate so that they are densely distributed thereon or when the temperature of the substrate is rising to heat it in an organic liquid, fine particles of metal catalyst agglomerate together forming larger fine particles or in the case of a silicon substrate, fine particles of transition metal form silicon and silicide and become sunken in the silicon substrate or in the case of a diamond substrate, fine particles of transition metal become sunken in diamond lattices, which in turn makes fine particles of metal catalyst uneven in radius and distribution.

Also, whether or not fine particles of metal catalyst agglomerate together and whether or not fine particles of metal catalyst become sunken are considered to depend on subtle surface state differences of the silicon substrate or diamond substrate which are not controllable at all under the existing state of technology.

Since a carbon nanotube consists of Graphene sheets made up of $sp^2$ hybridized orbital of carbon, it has a mechanical strength and conductivity which exceed those of diamond. If there exists lattice defects such as disorders in carbon arrangement or carbon vacancies in Graphene sheet, namely if the crystal quality is insufficient in Graphene sheet, it is not possible to exhibit the excellent mechanical property and electric conductivity of carbon nanotubes sufficiently.

By the way, while the solid-liquid contact cracking method is capable of synthesizing carbon nanotubes which is densely aligned and highly oriented and high in purity, there has been the problem that carbon nanotubes made thereby are insufficient in their crystal quality.

Also, the solid and liquid interfacial contact cracking method under identical conditions for manufacture such as thickness of a metal catalyst thin film, hydrogen plasma conditions, rate of temperature rise and heating temperature of a substrate in an organic liquid does not necessarily result in the synthesis of oriented and densely aligned carbon nanotubes which are identical in density and orientation, thereby carbon nanotubes have non-uniform alignment once in several manufactures, thus posing the problem that its reproducibility is poor.

The present inventors have found out that if in place of a conventional substrate on which a thin film of metal catalyst of a transition metal such as Fe, Co or Ni is applied and which is then exposed to hydrogen plasma to form fine particles of metal catalyst thereon, a substrate is used on which a Co metal thin film is deposited and which is then thermally oxidized to form ultra-fine particles of cobalt oxide thereon, carbon nanotubes can reproducibly be made which are uniformly oriented highly and aligned densely having a desired radius and density and which are about three times as dense as carbon nanotubes obtainable conventionally. Further, as a result of their zealous investigations on the cause for poor reproducibility in orientation, the present inventors have discovered that it is due to the thermal stress that develops when the synthesis reaction is terminated and have arrived at the present invention.

With the abovementioned problems taken into account, it is a first object of the present invention to provide densely aligned and highly oriented carbon nanotubes. A second object of the present invention is to provide an electron emission device using the substrate with densely aligned and highly oriented carbon nanotubes. A third object of the present invention is to provide a carbon nanotube synthesizing substrate for making densely aligned and highly oriented carbon nanotubes. A fourth object of the present invention is to provide a method of making a carbon nanotube synthesizing substrate for making densely aligned and highly oriented carbon nanotubes. A fifth object of the present invention is to provide a method of synthesizing densely aligned and highly oriented carbon nanotubes, and furthermore, a sixth object of the present invention is to provide an apparatus for making densely aligned and highly oriented carbon nanotubes.

Means for Solving the Problems

In order to achieve the first object mentioned above, the present invention provides a substrate with carbon nanotubes, characterized in that it comprises: a conductive substrate; fine particles of catalyst formed on a surface of the conductive substrate and a carbon nanotube grown on the fine particles of catalyst and oriented perpendicular to the surface of said conductive substrate, wherein the fine particles of catalyst consist of ultra-fine particles of cobalt oxide catalyst, and said ultra-fine particles of cobalt oxide catalyst have a degree of oxidation such that the bond energy of a core electron in cobalt shifts positively in a range of 1 eV to 3 eV, and the Raman spectrum of carbon nanotubes has a highest Raman scattering intensity in the vicinity of 1580 $cm^{-1}$, and the Raman scattering intensity in the vicinity of 1580 $cm^{-1}$ is two times or more as high as that in the vicinity of 1350 $cm^{-1}$.

The conductive substrate mentioned above is preferably a conductive silicon substrate or a conductive diamond substrate. The conductive substrate may comprise a substrate and a conductive film deposited onto said substrate wherein the substrate is a glass substrate, a semiconductor substrate, a metal substrate or an oxide substrate and said conductive film consists of any one of a silicon film or a diamond film. The diamond film preferably consists of any one of polycrystalline diamond, nanocrystalline diamond, diamond-like carbon and monocrystalline diamond.

According to the structure mentioned above, the substrate with carbon nanotubes which are high in crystal quality and are densely aligned and highly oriented can be obtained.

In order to achieve the second object mentioned above, the present invention provides an electron emission device, characterized in that it emits electrons by applying a voltage to apical ends of the carbon nanotubes in a substrate with carbon nanotubes as mentioned above.

According to this structure, the electron emission device in which carbon nanotubes are high in crystal quality and are densely aligned and highly oriented can reduce its driving voltage and have a current value obtained that is sufficient to emit a fluorescent material on the market for slow electrons. Moreover, the electron emission device needs no gate and can thus simplify the structure and reduce the cost of a surface light-emitting device for which the device is used. Furthermore, the carbon material remains unoxidized even in a low vacuum and thus allows realizing a light emitting device that can be paneled more easily, and is longer in operating life than those using a conventional electron emission device.

In order to achieve the third object mentioned above, the present invention provides a densely aligned and highly oriented carbon nanotube synthesizing substrate, characterized in that it comprises a substrate and ultra-fine particles of cobalt oxide formed on the substrate, and said ultra-fine particles of cobalt oxide have a degree of oxidation such that the bond energy of a core electron in cobalt shifts positively in a range of 1 eV to 3 eV. The substrate preferably is a silicon substrate or a diamond substrate. Also, the substrate may comprise a glass substrate, a semiconductor substrate, a metal substrate or an oxide substrate and a silicon film or a diamond film formed on the substrate.

The substrate of this structure to synthesize carbon nanotubes allows densely aligned and highly oriented carbon nanotubes to be synthesized reproducibly, at a density of about 1000 tubes per $\mu m^2$ and in orientation normal to the substrate. Also, especially if a diamond substrate or a substrate with a diamond film is used, then between carbon atoms in an area of junction between a carbon nanotube and the substrate there is formed an orbital hybridized of $sp^2$ hybridized orbital of carbon nanotube and $sp^3$ hybridized orbital of diamond, thereby serving to firmly bond the carbon nanotube and the substrate together. This substrate is optimum for use in an application where a high strength of bond of carbon nanotube to a substrate is required.

In order to achieve the fourth object mentioned above, the present invention provides a method of making a densely aligned and highly oriented carbon nanotube synthesizing substrate, characterized in that it comprises: depositing a cobalt thin film on a silicon or diamond substrate, or depositing a cobalt thin film on a substrate which comprises a silicon film or a diamond film formed on a glass substrate, a semiconductor substrate, a metal substrate or an oxide substrate; and thermally oxidizing the deposited cobalt thin film to a degree of oxidation such that the binding energy of a core electron of cobalt in the deposited cobalt thin film shifts positively in a range of 1 eV to 3 eV.

According to this method, ultra-fine particles of cobalt oxide of substantially an identical particle size can be formed on a silicon or diamond substrate or on a silicon or diamond film layered on a glass, semiconductor, metal or oxide substrate and moreover so that they are substantially uniformly distributed over the substrate. Also, the ultra-fine particles of oxide can keep their form and shape of distribution when carbon nanotubes are synthesized and further has a catalytic activity in synthesizing carbon nanotubes, thereby making it possible for densely aligned and highly oriented carbon nanotubes to be synthesized on the ultra-fine carbon oxide particles.

Preferably, the cobalt thin film is deposited to a film thickness of not more than 10 nm and the thermal oxidation is effected in air at a temperature in a range of 800° C. to 1000° C. for a time period in a range between 5 minutes and 20 minutes.

If the shift of a core electron of cobalt in binding energy is less than 1 eV, variations in radius and distribution of carbon nanotubes are then liable to occur, preventing reproducible synthesis of densely aligned and highly oriented carbon nanotubes. Conversely, if the shift of a core electron of cobalt in binding energy is more than 3 eV, then the ultra-fine particles of cobalt oxide lose their catalytic activity so that carbon nanotubes may not grow.

In order to achieve the fifth object mentioned above, the present invention also provides a method of synthesizing carbon nanotubes by solid-liquid interfacial contact cracking wherein a substrate carrying a catalyst composed of a transition metal or a catalyst composed of a transition metal oxide is heated in an organic liquid of alcohol to synthesize carbon nanotubes, characterized in that it comprises: a first synthesis process in which they are synthesized on the substrate at a low substrate temperature; and a second synthesis process split from the first synthesis process in which they are synthesized on the substrate at a high substrate temperature, and carbon nanotubes are grown oriented normal to the substrate in the first synthesis process and carbon nanotubes are further grown in the second synthesis process continuously on carbon nanotubes grown in the first synthesis process.

According to this method, in the first synthesis process at the low temperature, carbon nanotubes oriented normal to the substrate and insufficient in crystal quality are grown. In the second synthesis process at the high temperature, carbon nanotubes having excellent crystal quality are grown continuously on carbon nanotubes grown in the first synthesis process.

Making the synthesis time period of the first synthesis process short and making the synthesis time period of the second synthesis process long allows synthesizing carbon nanotubes most part of which is accounted for by those excellent in crystal quality.

The first synthesis process is preferably performed at a substrate temperature of 500° C. to 700° C. The second synthesis process is preferably performed at a substrate temperature of 750° C. to 1100° C. If the first synthesis process is carried out for a synthesis time period of not less than 10 seconds, then carbon nanotubes that are excellent in crystal quality are grown continuously on carbon nanotubes grown in the first synthesis process.

The present invention provides a second method of synthesizing carbon nanotubes by solid-liquid interfacial contact cracking wherein a substrate carrying a catalyst composed of a transition metal or a transition metal oxide is heated in an organic liquid to synthesize a carbon nanotube on the substrate, characterized in that it comprises a step of slowly cooling the substrate, thereby terminating a reaction to synthesize.

The slow cooling step is preferably a step in which in terminating the synthetic reaction, the energy for heating the substrate is switched off and in a predetermined time period thereafter the substrate is removed from the organic liquid into a gaseous atmosphere and is then held in the gaseous atmosphere. Alternatively, the slow cooling step may comprise a step in which in terminating the synthetic reaction, the substrate is removed from the organic liquid into a gaseous atmosphere and in a predetermined time period thereafter the energy for heating the substrate is switched off and then the substrate is maintained in the gaseous atmosphere.

If the organic liquid is alcohol, the predetermined time period is then preferably not more than 10 seconds. Also, the slow cooling step may be a step in which in terminating the synthetic reaction, the substrate is removed from the organic liquid into a gaseous atmosphere and in a predetermined time period thereafter, the energy for heating the substrate is decreased gradually and then switched off.

The method mentioned above operates as follows. In synthesizing carbon nanotubes by solid-liquid interfacial contact cracking for supplying the substrate with energy to heat it by such as electrical heating, the substrate is maintained at a high temperature of 500 to 1000° C. to hold carbon nanotubes grown on the substrate at a high temperature close to the substrate temperature. On the other hand, the organic liquid surrounding the substrate is held at a low temperature of not more than its boiling temperature (e.g., 64.7° C. if the organic liquid is methanol).

In terminating the synthetic reaction in the conventional solid-liquid interfacial contact cracking method, it has been the practice to terminate the energy to heat the substrate by way of terminating the substrate heating current while the substrate is held in the organic liquid and to remove the substrate from the organic liquid after the substrate is sufficiently cooled in the organic liquid. Since the substrate and carbon nanotubes growing on the substrate are in contact with the organic liquid high in thermal conductivity, terminating the energy to heat the substrate rapidly cools the substrate and the carbon nanotubes growing on the substrate from a high temperature of 500 to 1000° C. to the boiling point of the organic liquid. Also, since the substrate (e.g., silicon substrate) and the carbon nanotubes vary in thermal conductivity or heat capacity to the organic liquid, a large temperature difference develops between the substrate and the carbon nanotubes while they are cooled and a large difference in heat shrinkage is created between the substrate (e.g., silicon substrate). Between the substrate and the carbon nanotubes, there develops a thermal stress that is sufficient to reorient the carbon nanotubes grown normal to the substrate. This is considered to be the reason why the conventional solid-liquid interfacial contact cracking method was low in reproducibility on orientation.

To meet with this problem, the present invention in the method cuts off the energy to heat the substrate, quickly removes the substrate from the organic liquid low in temperature and high in thermal conductivity and then holds the substrate in a gas low in thermal conductivity. Consequently, the substrate and the carbon nanotubes are placed in a state close to their thermal equilibrium state in which no large temperature difference develops between the substrate and the carbon nanotubes while they are cooled and no large difference in heat shrinkage is created between the substrate and the carbon nanotubes. Thus, no such thermal stress develops as to reorient the carbon nanotubes grown normal to the substrate. Hence, there becomes higher the reproducibility on orientation. By removing the substrate from the organic liquid low in temperature and high in thermal conductivity and thereafter cutting off the energy to heat the substrate and slowly cooling the substrate, or by removing the substrate from the organic liquid low in temperature and high in thermal conductivity and thereafter gradually decreasing the energy to heat the substrate to cool the substrate, the effect is likewise brought about and the reproducibility on orientation becomes higher.

The densely aligned and highly oriented carbon nanotubes obtained in accordance with said method of synthesis may consist of densely aligned and highly oriented carbon nanotubes synthesized by any one of the synthesis methods described above on a substrate as described above.

Since these densely aligned and highly oriented carbon nanotubes of the present invention are constituted by a low cost substrate and carbon nanotubes oriented normal to the substrate and aligned at an unprecedentedly high density and synthesized by a low cost synthesis method, they are capable of improving at low cost the performance of a device such as an electron emission device, an electrode of a double layer capacitor or an electrode of a fuel cell using densely aligned and highly oriented carbon nanotubes.

Also, while carbon nanotubes can be applied to not only such devices as mentioned above but varieties of technical fields, densely aligned and highly oriented carbon nanotubes of the present invention which can be manufactured at a low cost and has a form commonly used in various technical fields. Namely, they are aligned densely perpendicular to and firmly bonded to their substrate, can serve in varieties of applied researches and commercialization studies requiring them, and can thus contribute to promoting a variety of such researches and studies.

Further in said second synthesis, the synthetic reaction is preferably in organic liquid of alcohol, via a first synthetic process to synthesize at low substrate temperature and a second synthetic process to synthesize at high substrate temperature, synthesizing carbon nanotubes on said substrate. The substrate carrying a catalyst thereon is such that cobalt thin film of thickness of not more than 10 nm is preferably formed on a conductive substrate, and said cobalt thin film is thermally oxidized in air at a temperature ranging between 800° C. and 1000° C. for a time period ranging between 5 minutes and 20 minutes. It is preferred that the first synthesis process be performed at a substrate temperature of 500° C. to 700° C. and the second synthesis process be performed at a substrate temperature of 750° C. to 1100° C. The first synthesis process is preferably carried out for a synthesis time period of from 0 seconds to not more than 3 minutes.

The carbon nanotubes synthesized in accordance with the method of the present invention can be used for an electron emission device. Since the crystal quality of carbon nanotubes is higher than those of the prior art, the electron emission efficiency of this electron emission device is extremely higher than that of the prior art.

According to the method configured as mentioned above, the carbon nanotubes with high purity can be manufactured using solid-liquid interfacial contact cracking method. Also, the electron emission device comprising carbon nanotubes, which are densely aligned, highly oriented, and have high crystal quality, can be manufactured reproducibly at an extremely high yield.

In order to achieve the sixth object mentioned above, the present invention provides an apparatus for synthesizing carbon nanotubes by solid-liquid interfacial contact cracking synthesis wherein a substrate carrying a catalyst composed of a transition metal or a transition metal oxide is heated in an organic liquid to synthesize carbon nanotubes onto said substrate, characterized in that it comprises a liquid tank to hold organic liquid, a water cooling means to hold the organic liquid temperature below its boiling point, a gas introducing valve to introduce gas as the gaseous atmosphere to prevent the contact of organic liquid vapor and air, an electrode to hold the substrate and to flow electric current to said substrate, and an electrode moving part connected to the electrode, and said electrode moving part takes out the substrate from organic liquid into gaseous atmosphere at the pre-determined speed. According to this apparatus, since the substrate on which carbon nanotubes are grown can be quickly taken out from the organic liquid low in temperature and high in thermal conductivity, it is possible to reproducibly synthesize carbon nanotubes oriented normal to the substrate.

Effects of the Invention

According to synthesizing methods of carbon nanotubes of the present invention, carbon nanotubes having an excellent crystal quality, that there are little lattice defects such as disorders in carbon lattices arrangement and carbon vacancies, can be synthesized. It is also possible to realize providing an electron emission device extremely higher in electron emission efficiency than those in the prior art.

According to a substrate with carbon nanotubes, an electron emission device using the substrate and methods of making them, a substrate with carbon nanotubes which are highly oriented, densely aligned and have high a crystal quality can be used to realize providing an electron emission device which is extremely higher in electron emission efficiency than those in the prior art. According to an electron emission device of the present invention, the driving voltage therefor can be reduced and a current value that is sufficient to emit a fluorescent material on the market for slow electrons can be obtained. Moreover, an electron emission device of the present invention needs no gate electrode and can thus simplify the structure and reduce the cost of a surface light-emitting device for which the device is used. Further, the carbon material remains unoxidized even in a low vacuum and thus allows realizing a light emitting device that can be paneled more easily, and is longer in operating life than those using a conventional electron emission device.

According to a carbon nanotube synthesizing apparatus of the present invention, carbon nanotubes oriented normal to the substrate can be synthesized reproducibly and an electron emission device having high electron emission efficiency can be manufactured.

Figure 1:
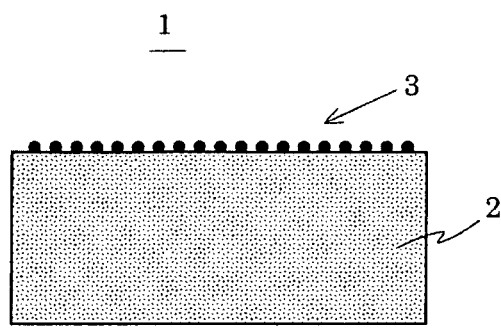
FIG. 1 illustrates in diagrammatic cross-sectional view the structure of a substrate for synthesizing carbon nanotubes which are densely aligned and highly oriented according to a first form of implementation of the present invention, (a) shows a substrate is composed of a single material and (b) shows a substrate is composed of a plurality of materials.
Figure 1:
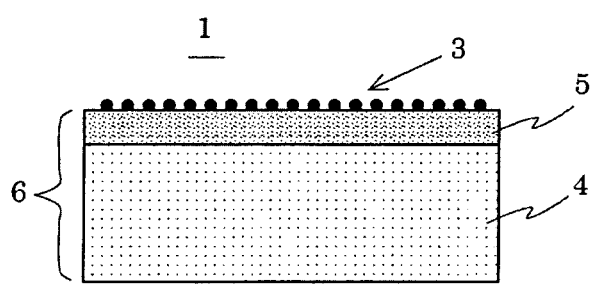

DESCRIPTION OF REFERENCE NUMERALS 1, 10: substrate for synthesizing carbon nanotubes which are densely aligned and highly oriented
2: substrate
3: ultra-fine particles of cobalt oxide
4: substrate
5: silicon film or diamond film
6: substrate
7: thin film of cobalt
11: carbon nanotubes
11a: apical ends of carbon nanotubes
12: silicon substrate
13: fibrous carbon nanotubes
14: particulate carbon nanotubes
20: carbon nanotubes
21: conductive Si substrate
22: spacer
23: glass substrate
23a: transparent electrode
30: organic liquid
31: liquid tank
32: water cooling means
33: substrate
34: electrode
35: substrate holder
36: water cooling pipe
37: condensing means 38: gas inlet valve
39: cover
40: carbon nanotube synthesis apparatus
42: electrode
43: electrode
44: insulating clamping member
45: electrode moving part
46: gaseous atmosphere
50, 60: electron emission device
51: conductive substrate
53, 65: anode electrode
62: conductive substrate
62a: substrate
62b: film
63: ultra-fine particles of cobalt oxide
64: carbon nanotubes
64a: carbon nanotube apical end
66: power supply

BEST MODES FOR CARRYING OUT THE INVENTION

Hereinafter, best modes for carrying out the present invention will be described in details with reference to the Drawing Figures in which the same reference characters are used to designate the same or corresponding components.

At the outset, mention is made of a substrate for synthesizing carbon nanotubes which are densely aligned and highly oriented.

FIG. 1 illustrates in diagrammatic view the structure of a substrate for synthesizing carbon nanotubes which are densely aligned and highly oriented according to the present invention. (a) shows that a substrate is composed of a single material and (b) shows that a substrate is composed of a plurality of materials.

As shown in FIG. 1(a), a substrate 1 for synthesizing densely aligned and highly oriented carbon nanotubes comprises a base substrate 2 and ultra-fine particles of cobalt oxide 3 substantially uniformly distributed on the base substrate 2 and having substantially an identical grain size. The base substrate 2 is here a silicon substrate or a diamond substrate.

The ultra-fine particles 3 of cobalt oxide preferably have a degree of oxidation such that the binding energy of core electrons in cobalt is shifted positively in a range of 1 eV to 3 eV. If the shift of a core electron of cobalt in binding energy is less than 1 eV, variations in radius and distribution of carbon nanotubes are then liable to occur, preventing reproducible synthesis of densely aligned and highly oriented carbon nanotubes. Conversely, if the shift of a core electron of cobalt in binding energy is more than 3 eV, then the ultra-fine particles of cobalt oxide lose their catalytic activity so that carbon nanotubes may not grow. The ultra-fine particles of cobalt oxide 3 preferably have a grain size of not more than 10 nm.

FIG. 1(b) shows an instance where the substrate consists of a plurality of materials. In this instance, the synthesizing substrate 1 comprises a base substrate 6 that consists of a substrate 4 and a silicon film 5 or a diamond film 5 formed on the substrate 4, and ultra-fine particles 3 of cobalt oxide 3 substantially uniformly distributed over the base substrate 6 and having substantially a uniform particle size. The preferred degree of oxidation and the particle size there of ultra-fine particles of cobalt oxide are as mentioned in connection with FIG. 1(a). For the base substrate 4, a low cost substrate such as a glass, semiconductor, oxide or metal substrate may be used. The diamond film 5 may be of any of polycrystalline diamond, nanocrystalline diamond, diamond-like carbon and monocrystalline diamond. If the diamond film is used, then there is formed an orbital hybridized of $sp^2$ hybridized orbital of carbon nanotube and $sp^3$ hybridized orbital of diamond between carbon atoms in an area of junction between a carbon nanotube and the substrate, thereby serving to firmly bond the carbon nanotubes and the substrate together.

Figure 2:
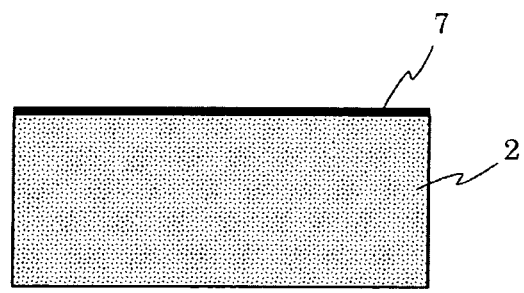
FIG. 2 is a flow chart illustrating a method of making substrate for synthesizing densely aligned and highly oriented carbon nanotubes according to the present invention.
Figure 2:
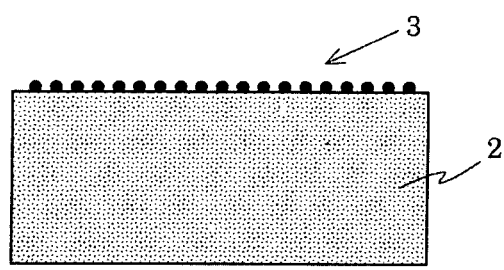

Mention is next made of a method of making a substrate for synthesizing carbon nanotubes which are densely aligned and highly oriented. FIG. 2 is a flow chart illustrating a method of making substrate for synthesizing densely aligned and highly oriented carbon nanotubes according to the present invention. While this chart shows that the cobalt oxide is thermally oxidized in air, it suffices if it is thermally oxidized in an oxidizing atmosphere if not air. Also, while in FIG. 2 the base substrate is shown to be of silicon or diamond, it is likewise if the base substrate is one having a silicon film or a diamond film formed on a glass, semiconductor, metal or oxide substrate.

As shown in FIG. 2(a), a thin film of cobalt 7 is formed on a silicon base substrate 2 or diamond base substrate 2. Any known film forming method such as vacuum deposition, CVD (chemical vapor deposition) or sputtering may be used. The film thickness is possibly several tens nm but preferably not more than 10 nm if carbon nanotubes are to be synthesized aligned densely.

As shown in FIG. 2(b), the thermal oxidation in air at a predetermined temperature and for a time period causes ultra-fine particles of cobalt oxide 3 having substantially an identical particle size to be formed on and distributed substantially uniformly over the base substrate 2. The temperature and time period are conditions for thermally oxidizing cobalt to a degree of oxidation such that the binding energy of core electrons in cobalt is shifted positively by a range of 1 eV to 3 eV. Such a degree of oxidation can be achieved by oxidation at a temperature ranging between 800° C. and 1000° C. for a time period ranging between 5 minutes and 20 minutes if a cobalt thin film having a film thickness of not more than 10 nm is to be formed in an atmosphere of air. If the degree of oxidation is so low that the shift of binding energy of a core electron in cobalt is less than 1 eV, then variations in radius and distribution of carbon nanotubes are liable to occur, preventing reproducible synthesis of densely aligned and highly oriented carbon nanotubes. If the degree of oxidation is so high that the shift of a core electron of cobalt in binding energy is more than 3 eV, then the ultra-fine particles of cobalt oxide lose their catalytic activity so that carbon nanotubes may not grow.

Also, a polycrystalline diamond film, nanocrystalline diamond film, diamond-like carbon film or monocrystalline diamond film can be synthesized on a glass substrate, semiconductor substrate, metal substrate or oxide substrate by chemical vapor deposition or plasma chemical vapor deposition using hydrogen and hydrocarbon gases as the source gases (See Non-patent Reference 1.).

A method of synthesizing carbon nanotubes using a substrate for making densely aligned and highly oriented carbon nanotubes will be mentioned next.

Figure 18:
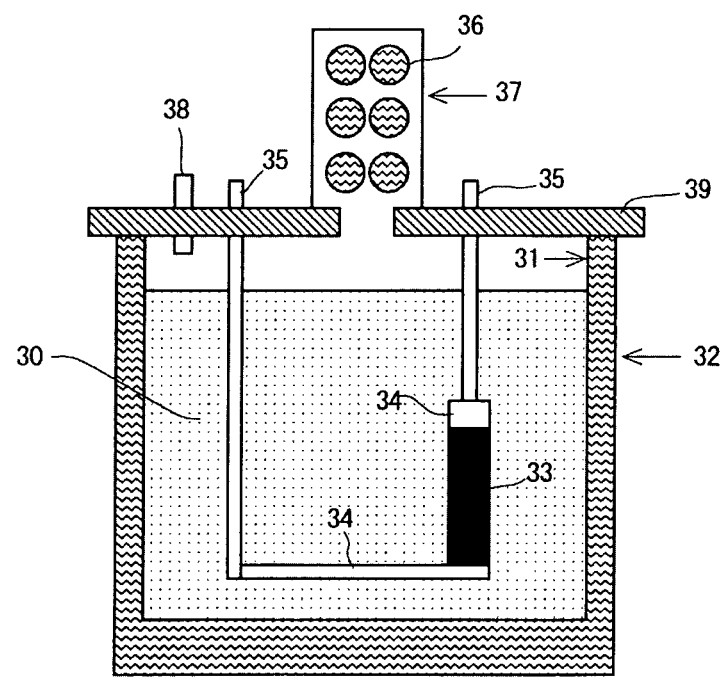
FIG. 18 is a diagrammatic cross-sectional view illustrating a synthesis apparatus for use in the solid-liquid interfacial contact cracking method in organic liquid according to the prior art.

In synthesizing carbon nanotubes by solid-liquid interfacial contact cracking in an organic liquid, the apparatus mentioned in connection with FIG. 18 is used with methanol or ethanol as the organic liquid. The substrate for synthesizing carbon nanotubes densely aligned and highly oriented of the present invention may be arranged on the substrate holder and an electric current flown through the substrate to heat the substrate to a temperature ranging between 900° C. and 400° C. for a predetermined time period. The time period is chosen depending on a desired length of carbon nanotubes. Also, if the temperature may be held less than 900° C. while carbon nanotubes are being synthesized, the thermal chemical vapor deposition or plasma chemical vapor deposition may be used (See Patent Reference 2.).

Mention is next made of densely aligned and highly oriented carbon nanotubes.

Figure 3:
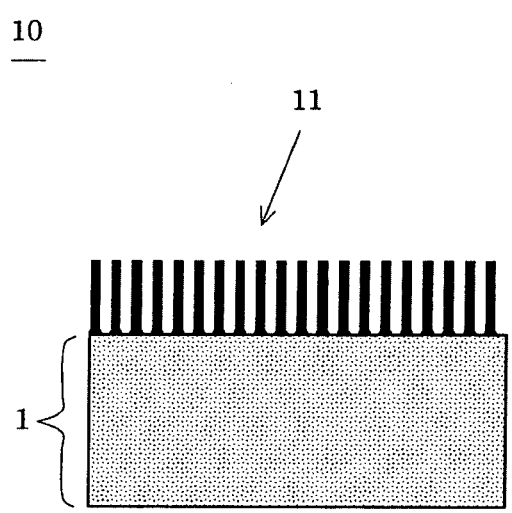
FIG. 3 is a diagram illustrating the structure of densely aligned and highly oriented carbon nanotubes according to the present invention.

FIG. 3 is a diagram illustrating the structure of densely aligned and highly oriented carbon nanotubes according to the present invention. Densely aligned and highly oriented carbon nanotubes 10 of the present invention comprises a densely aligned and highly oriented carbon nanotube synthesizing substrate 1 of the present invention as mentioned in FIG. 1 above and densely aligned and highly oriented carbon nanotubes 11 which are grown perpendicularly to and densely on the substrate 1.

The densely aligned and highly oriented carbon nanotubes 11 can be synthesized from the low-cost substrate 1 and by the low-cost synthesis method mentioned above. And, they are of the highest density so far made, i.e. about two or three times as dense as those densely aligned and highly oriented carbon nanotubes which are synthesized using the conventional method of solid-liquid interfacial contact cracking in organic liquid (See Patent Reference 1.) and hence are capable of improving the performance and reducing the cost of a device using densely aligned and highly oriented carbon nanotubes, such as an electron emission device, the electrode of a double layer capacitor or that of a fuel cell.

While carbon nanotubes can be applied not only to a device as mentioned above but also to a variety of technical fields and have seen progresses of their applied and commercialization researches in various fields of their applications. Densely aligned and highly oriented carbon nanotubes according to the present invention can be manufactured at a low cost and has a form commonly used in various technical fields. Namely, they are aligned densely perpendicular to their substrate, can be used conveniently in varieties of applied researches and commercialization studies requiring them and can thus promote a variety of such researches and studies.

EXAMPLE 1

Mention is next made of Example 1.

As the base substrate, a n-type Si (100) oriented substrate (having a specific resistance of 0.0026 Ω·cm and a size of 7×22×0.5 mm) was used.

Initially, a cobalt thin film was deposited onto this substrate to a thickness of about 6 nm by magnetron sputtering and the substrate was then thermally oxidized in air at 900° C. for 10 minutes.

Figure 7:
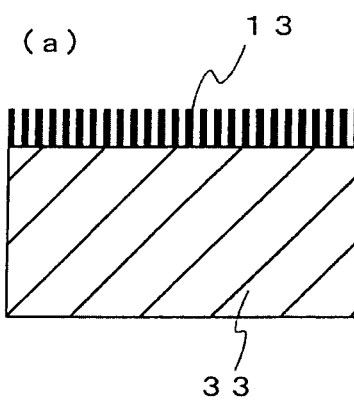
FIG. 7 is a diagram illustrating the shape and crystal quality of carbon nanotubes synthesized in accordance with a method of the present invention.
Figure 7:
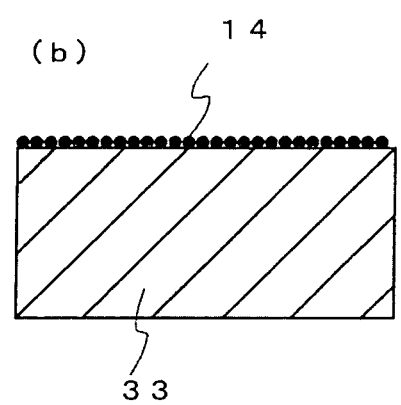
Figure 7:
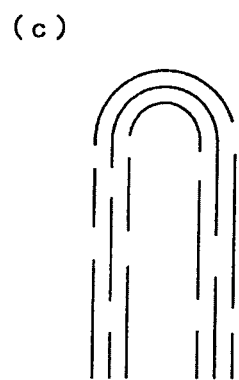
Figure 7:
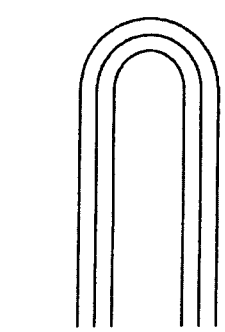

Then, in the apparatus shown in FIG. 7 carbon nanotubes were synthesized thereon by solid-liquid interfacial contact cracking in organic liquid in the apparatus as shown in FIG. 7.

Synthesis conditions used for solid-liquid interfacial contact cracking in an organic liquid are as follows:

Source organic liquid: methanol (purity of 99.9% and boiling point of 64.7° C.);

Synthesis temperature: 600° C.; and

Synthesis time: 5 minutes.

Figure 4:
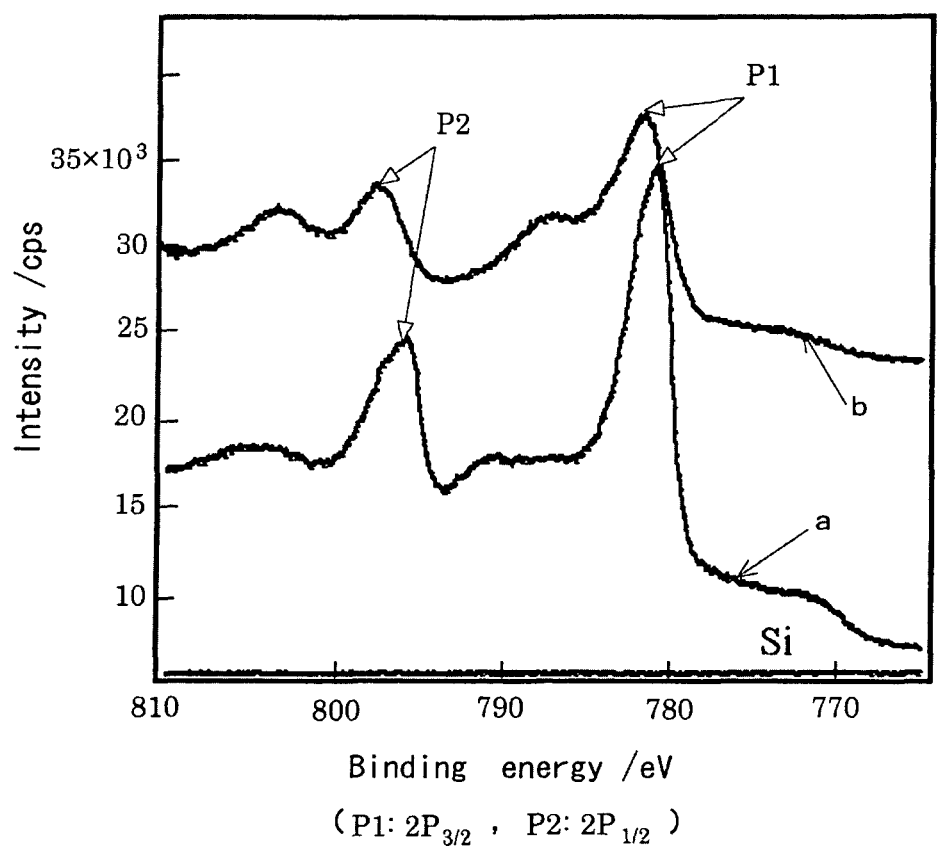
FIG. 4 is a chart illustrating spectra for the binding energy of core electrons in cobalt in the form of a thin film before heat treatment in air at 900° C. for 10 minutes and in cobalt oxide in the form of ultra-fine particles after the heat treatment.

FIG. 4 is a chart illustrating X-ray photoelectron spectra for a thin film of cobalt before heat treatment in air at 900° C. for 10 minutes and for ultra-fine particles of cobalt oxide formed by this heat treatment. The measurement apparatus was an XPS (X-ray photoelectron spectroscopy) equipment. The abscissa axis represents the binding energy indicated in eV and the ordinate axis represents the intensity (cps) of photoelectrons. In the chart, the graph a indicates an X-ray photoelectron spectrum for cobalt thin film before the heat treatment and the graph b indicates X-ray photoelectron spectrum for cobalt oxide ultra-fine particles formed by the heat treatment. Here, for ease of comparison, the graph b is shown on shifting the 0 level of intensity. Also, the graph shown below is a background level for the silicon substrate.

From FIG. 4, it is seen that peak P1 for cobalt core electrons whose hybridized total angular momentum is $3/2$ where hybridized orbital angular momentum is 2P and peak P2 for cobalt core electrons whose hybridized total angular momentum is $1/2$ where hybridized orbital angular momentum is 2P shift positively by about 2 eV after thermal treatment and have their peak intensities reduced. Although not shown, if the shift in peak is less than 1 eV, then the phenomenon that carbon nanotubes are synthesized fluctuating in radius or reducing in density was likely to occur. Also, while not shown, if the shift in peak exceeds 3 eV, then carbon nanotubes were not synthesized at all.

From these results, it is considered that while thermally oxidizing a cobalt thin film at a high temperature of 900° C. causes ultra-fine particles of cobalt oxide extremely small in particle size to be formed on a substrate, distributing evenly over its surface, the oxidation weakens the reactivity of cobalt and silicon with each other while restraining cobalt oxide ultra-fine particles from agglomerating with one another on the silicon surface or from sinking in the silicon substrate. It is also considered that if the degree of oxidation is excessively high, then the cobalt oxide ultra-fine particles lose their catalytic activity so that no reaction for synthesis of carbon nanotubes is brought about. While if the substrate temperature in synthesizing carbon nanotubes exceeds 900° C., then densely aligned and highly oriented carbon nanotubes cannot be synthesized reproducibly. It is considered that this is because at a temperature in excess of 900° C., it is no longer negligible for cobalt oxide and silicon to react with each other and then cobalt oxide ultra-fine particles are likely to coalesce with one another and to sink into the substrate.

Figure 5:
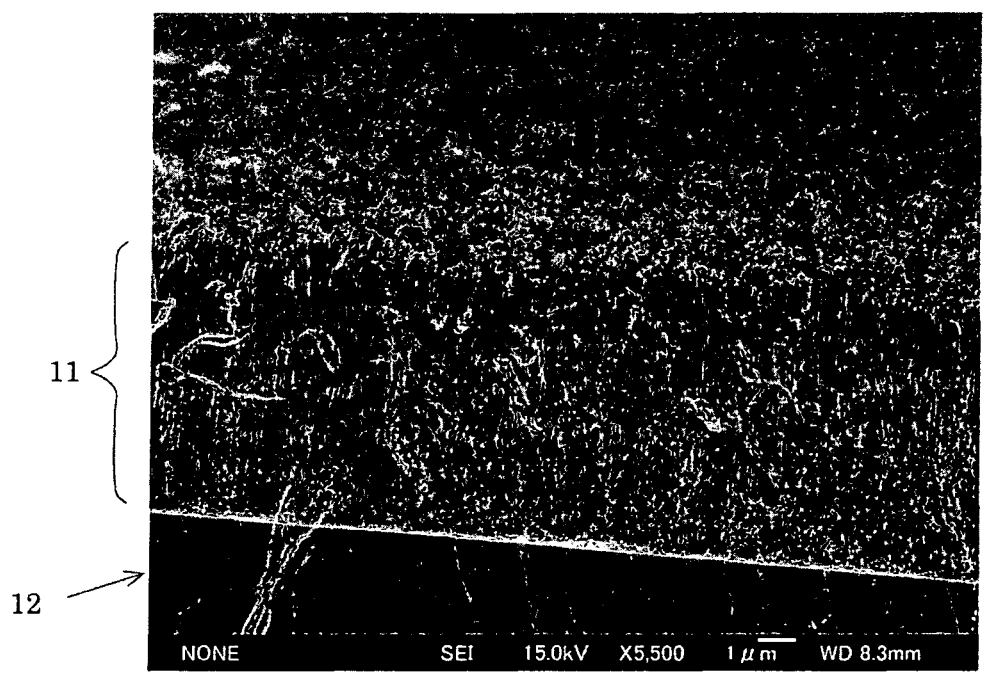
FIG. 5 is a SEM (scanning electron microscopic) image illustrating the cross section of densely aligned and highly oriented carbon nanotubes according to the present invention.
Figure 19:
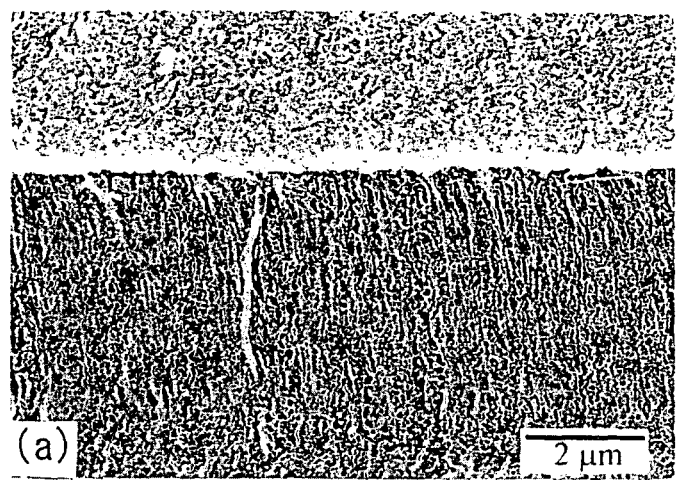
FIG. 19 is a SEM image illustrating a cross section of densely aligned and highly oriented carbon nanotubes made by the solid-liquid interfacial contact cracking method in organic liquid using a substrate according to the prior art.
Figure 19:
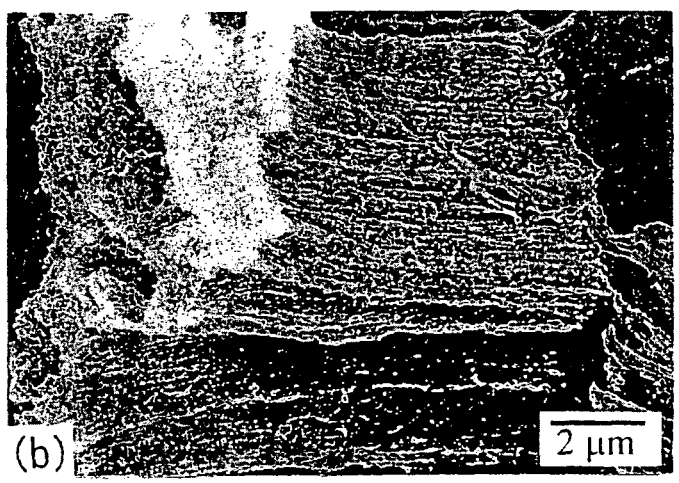

FIG. 5 is a SEM (scanning electron microscopic) image illustrating the cross section of the densely aligned and highly oriented carbon nanotubes synthesized under the conditions mentioned above. It is an image taken from obliquely above of a surface of a substrate that is cleaved. As shown, nanotubes 11 are seen to grow perpendicularly to the silicon substrate 12 with an extremely high density. The density of these carbon nanotubes is seen to be about two or three times as high as that of densely aligned and highly oriented carbon nanotubes as shown in FIG. 19 which were synthesized by the conventional method of solid-liquid interfacial contact cracking in organic liquid.

Figure 6:
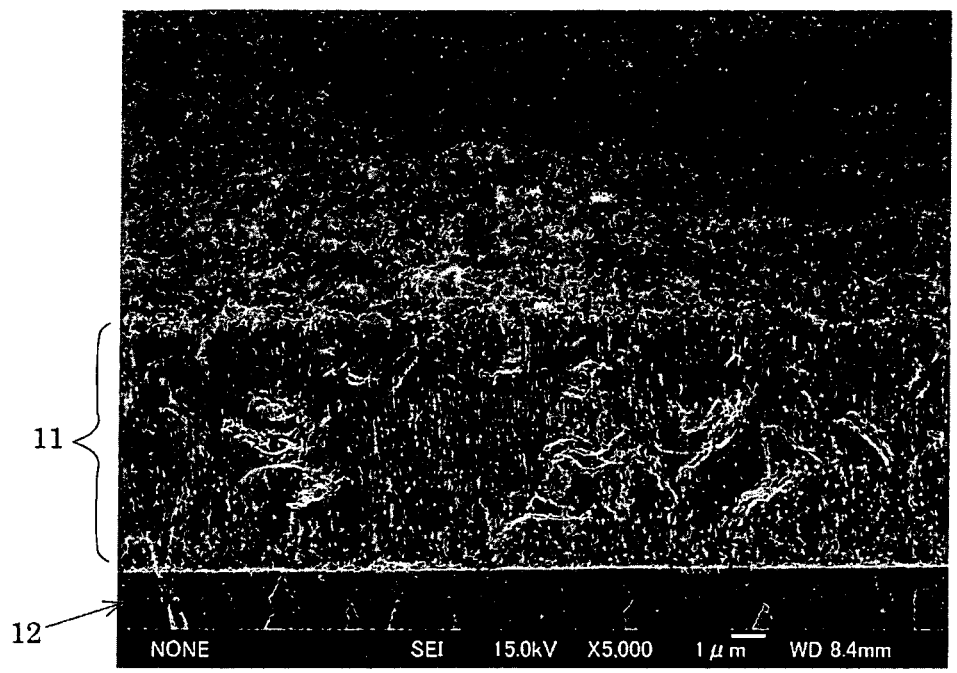
FIG. 6 is a SEM image illustrating the cross section of densely aligned and highly oriented carbon nanotubes according to the present invention.

FIG. 6 is another SEM (scanning electron microscopic) image illustrating the cross section of densely aligned and highly oriented carbon nanotubes of the present invention which were synthesized another day under the same conditions as shown in FIG. 5.

Comparing FIGS. 5 and 6 shows that the density and orientation of carbon nanotubes are identical. From this result, it is found that the use of a densely aligned and highly oriented carbon nanotube synthesizing substrate of the present invention allows densely aligned and highly oriented carbon nanotubes to be synthesized reproducibly.

A method of synthesizing carbon nanotubes according to the present invention will be mentioned next.

FIG. 7 is a diagram illustrating the shape and crystal quality of carbon nanotubes synthesized in accordance with a method of the present invention. In the Figure, (a) and (b) show diagrammatically shapes of carbon nanotubes synthesized in a first synthesis process at a low substrate temperature of 500 to 700° C. and at a high substrate temperature over than 700°

C., respectively. (c) and (d) show diagrammatically crystal qualities of carbon nanotubes synthesized by the first synthesis process alone and synthesized by the first synthesis process plus a second synthesis process, respectively, with lines indicating cross sections of multi-layer carbon nanotubes. Discontinuous portions of the lines diagrammatically indicate lattice defects such as a disorder in arrangement of carbon atoms and carbon vacancies therein. Here, the method of the present invention for synthesis can be carried out using a conventional apparatus for synthesis as shown in FIG. 18. The explanation will be described using FIG. 18 as a reference.

First, a thin film of metal catalyst of a transition metal such as Fe, Co or Ni was deposited onto a conductive silicon substrate or diamond substrate. The substrate is then exposed to hydrogen plasma or thermally oxidized to have fine particles of catalyst carried thereon distributed at a high density.

Figure 8:
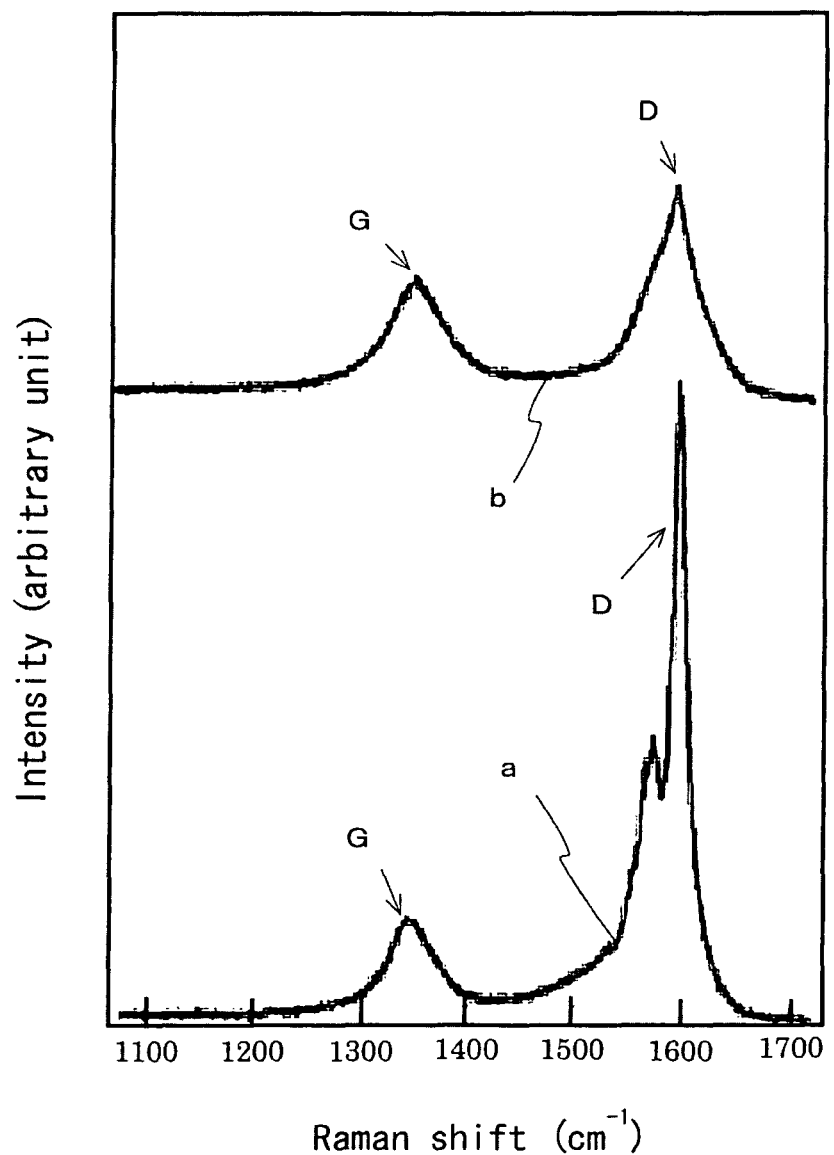
FIG. 8 is a chart illustrating results of Raman spectroscopic analysis of carbon nanotubes synthesized in Example 2.

Next, the substrate 33 mentioned above is held on the substrate holder 35 in an synthesis apparatus as shown in FIG. 8 which is loaded with an organic liquid of alcohol. An electric current is flown through the substrate 33 via the substrate holder 35 to heat the substrate to a temperature in the first synthesis process. When the substrate temperature is held at 500 to 700° C., the fibrous carbon nanotubes 13 oriented perpendicular to the substrate 33 grow as shown in FIG. 7(*a*). If the substrate temperature is in excess of 700° C., particulate carbon nanotubes 14 grow as shown in FIG. 7(*b*). The temperature is preferably set to not more than 700° C. Also, the carbon nanotubes 13 grown in the first synthesis process have crystallographically imperfects as shown in FIG. 7(*c*).

Next, the electric current flown through the substrate 33 is altered to heat the substrate to a temperature in the second synthesis process to cause the carbon nanotubes grown in the first synthesis process to continue to grow. Then, when the substrate temperature in a range between 750° C. and 100° C., carbon nanotubes excellent in crystal quality allow to grow as shown in FIG. 7(*d*). If it is lower than 750° C., carbon nanotubes continued to grow had an imperfect crystal quality as shown in FIG. 7(*c*). If it exceeds 1100° C., then carbon nanotubes continued to grow were not be oriented perpendicular to the substrate.

The carbon nanotubes 13 obtained by the first synthesis process has not sufficient crystal quality and is desirably as short as possible. However, the synthesis time period of 10 seconds or more in the first synthesis process makes it possible for carbon nanotubes 13 grown in the first synthesis process to continue to be grown by the second synthesis process. If it is less than 10 seconds, carbon nanotubes grown in the first synthesis process cannot be continued to grow by the second synthesis process.

EXAMPLE 2

Example 2 on a method of synthesizing carbon nanotubes in accordance with the present invention will be mentioned.

First, a cobalt thin film of 5 nm was deposited on a conductive silicon substrate by sputtering a cobalt target in an argon (Ar) atmosphere of 7 Pa with a discharge current of 35 mA for 3 minutes.

Then, the substrate was thermally oxidized to make a silicon conductive substrate carrying ultra-fine particles of cobalt oxide. The conditions for thermal oxidation were 900° C. and 15 minutes of heating by current passage in air. This thermal oxidation step was carried out in a way as mentioned in connection with FIG. 2 and is characterized in that in making densely aligned and highly oriented carbon nanotubes synthesizing substrate, a cobalt thin film deposited on a silicon or diamond substrate or a cobalt thin film deposited on a substrate comprising a glass, semiconductor, metal or oxide substrate and a silicon or diamond film formed thereon is thermally oxidized to a degree of oxidation such that the binding energy for a core electron in cobalt of the cobalt thin film is shifted positively in a range of 1 eV to 3 eV; it is thermally oxidized in air at a temperature ranging between 800° C. and 1000° C. for a time period ranging between 5 minutes and 20 minutes. In this thermal oxidation step, ultra-fine particles of cobalt oxide which are extremely small in particle size are formed and uniformly distributed on the substrate surface, and with oxidized cobalt weakening its reactivity with silicon, they are inhibited from coalescing together on the silicon surface and from sinking in the silicon substrate. Hence, there result densely aligned and highly oriented carbon nanotubes. Also, in this thermal oxidation step the degree of oxidation of cobalt is so apt that it retains its catalytic activity in cobalt oxide in the form of ultra-fine particles and sufficient to bring about a reaction to synthesize carbon nanotubes.

Next, carbon nanotubes were synthesized in a method of the present invention using the synthesis apparatus shown in FIG. 18. Conditions for synthesis are shown below.

Source organic liquid: methanol (purity of 99.9% and boiling point of 64.7° C.);
First synthesis process: substrate temperature of 600° C. and synthesis time period of 1 minute; and
Second synthesis process: substrate temperature of 900° C. and synthesis time period of 5 minutes.

As for a comparative specimen, carbon nanotubes were synthesized according to the conventional method at a substrate temperature of 700° C. for a synthesis time period of 6 minutes.

FIG. 8 is a chart illustrating results of Raman spectroscopic analysis of carbon nanotubes synthesized in Example 2. In the chart, the abscissa axis represents the Raman shift and the ordinate axis represents the Raman spectroscopic intensity. In FIG. 8, graph "a" represents a Raman spectrum of carbon nanotubes by the method of the invention and graph "b" represents a Raman spectrum of carbon nanotubes according to the conventional method.

In FIG. 8, the peak at 1580 cm$^{-1}$ indicated by "D" is called D band that is at a Raman scattering intensity based on lattice vibrations of a lattice formed of sp$^2$ hybridized orbital. The higher this intensity, the higher is the crystal quality of the lattice based on the sp$^2$ hybridized orbital. To wit, it is shown that there are little disorder of periodicity of carbon lattices and only a small number of carbon vacancies in the Graphene sheets which constitute carbon nanotubes. The peak at 1350 cm$^{-1}$ indicated by "G" is called G band that is at a Raman scattering intensity based on lattice vibrations of a lattice formed of sp$^3$ hybridized orbital.

From FIG. 8, it is seen that the ratio of D band to G band of carbon nanotubes according to the method of the present invention is 3 times as high as that of carbon nanotubes according to the conventional method. This shows that carbon nanotubes having high crystal quality than those according to the conventional method can be synthesized according to the method of the present invention.

EXAMPLE 3

Example 3 on an electron emission device of the present invention will be mentioned next.

An electron emission device using carbon nanotubes made in the Example of the carbon nanotube synthesizing according to the method of the present invention and an electron emission device using carbon nanotubes according to the conventional method were compared on their electron emission efficiencies.

Figure 9:
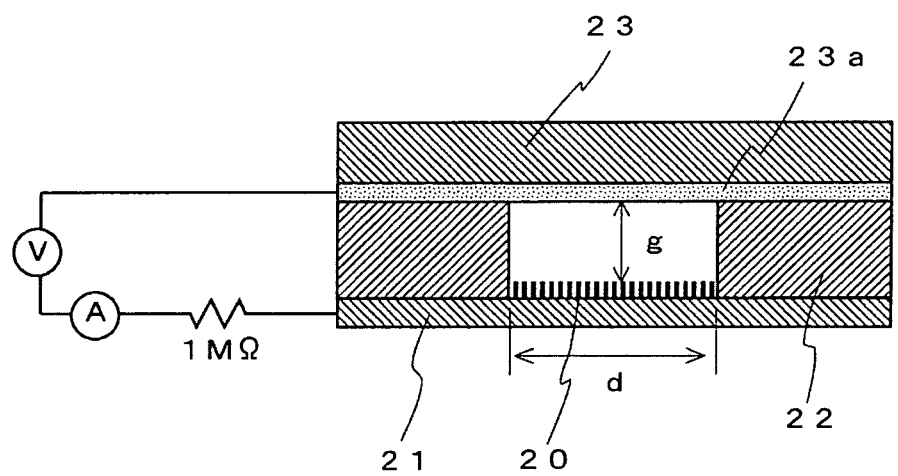
FIG. 9 is a diagram illustrating the structure of a device and a measuring circuit used in the measurement of electron emission efficiency.

FIG. 9 is a diagram illustrating the structure of a device and a measuring circuit used in the measurement of electron emission efficiency. A conductive Si substrate 21 having carbon nanotubes 20 grown thereon was opposed via a spacer 22 to a glass substrate 23 having a transparent ITO (indium-tin-oxide film) electrode 23a vapor deposited thereon. And, with a voltage applied between the substrate 21 and the transparent electrode 23a, electric current flown between them was measured as a function of applied voltage. The carbon nanotubes 20 had their apical ends spaced from the transparent electrode 23a by a distance g of 100 μm and existed in an area on the substrate 21 which area was square having a side d of 3 mm.

Figure 10:
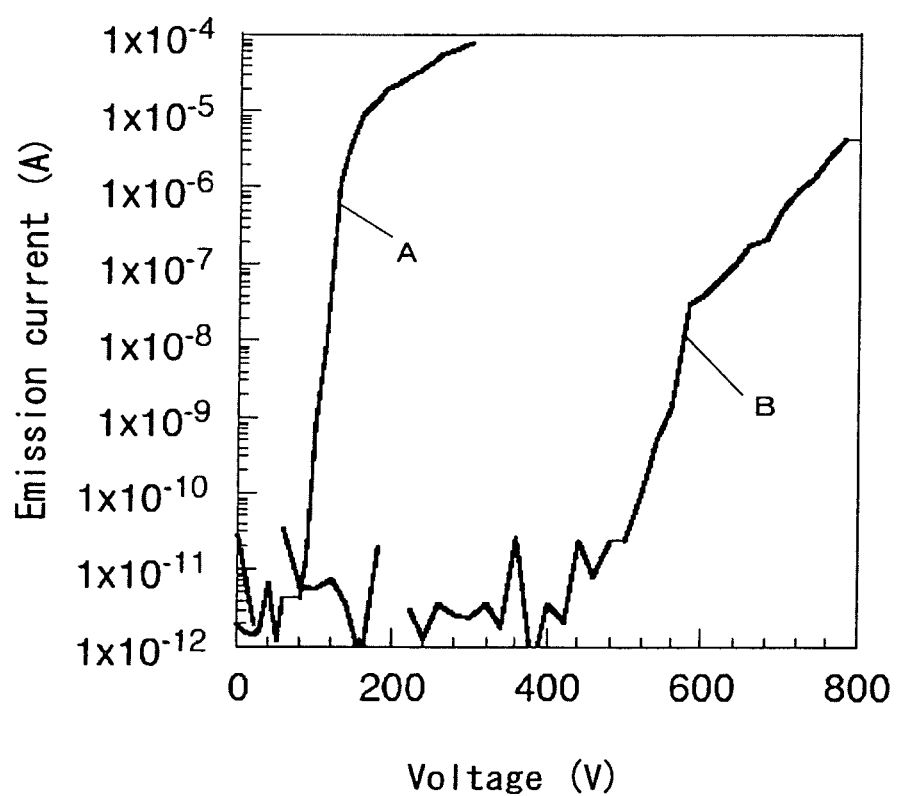
FIG. 10 is a chart illustrating electron emission characteristics of an electron emission device using carbon nanotubes according to the present invention and of an electron emission device using carbon nanotubes according to the prior art.

FIG. 10 is a chart illustrating electron emission characteristics of an electron emission device using carbon nanotubes according to the present invention and of an electron emission device using carbon nanotubes according to the prior art. The abscissa axis represents the voltage applied between the substrate and the transparent electrode and the ordinate axis represents the current flown between the substrate and the transparent electrode. In the chart, "A" represents electron emission characteristic of the electron emission device using carbon nanotubes according to the method of the present invention and "B" represents emission characteristic of the electron emission device using carbon nanotubes according to the conventional method.

As is apparent from FIG. 10, the electron emission efficiency of an electron emission device using carbon nanotubes according to the method of the present invention is extremely higher than that of an electron emission device using carbon nanotubes according to the conventional method. It is seen, for example, that when compared at an applied voltage of 350 volts, the electron emission efficiency of the electron emission device using carbon nanotubes according to the method of the present invention is about $2 \times 10^7$ times as high as that of the electron emission device using carbon nanotubes according to the conventional method. This effect arises from the fact that carbon nanotubes according to the method of the present invention have extremely high crystal quality than that of carbon nanotubes according to the conventional method.

An apparatus of the present invention for use in the method of synthesizing carbon nanotubes of the present invention will be described.

Figure 11:
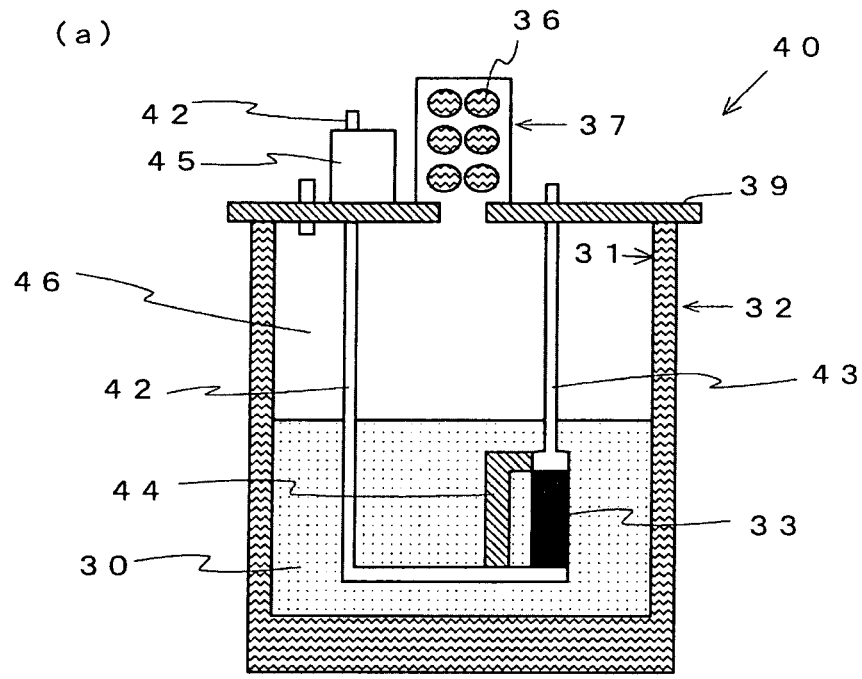
FIG. 11 is a diagrammatic cross-sectional view illustrating an apparatus for synthesizing carbon nanotubes according to the present invention.
Figure 11:
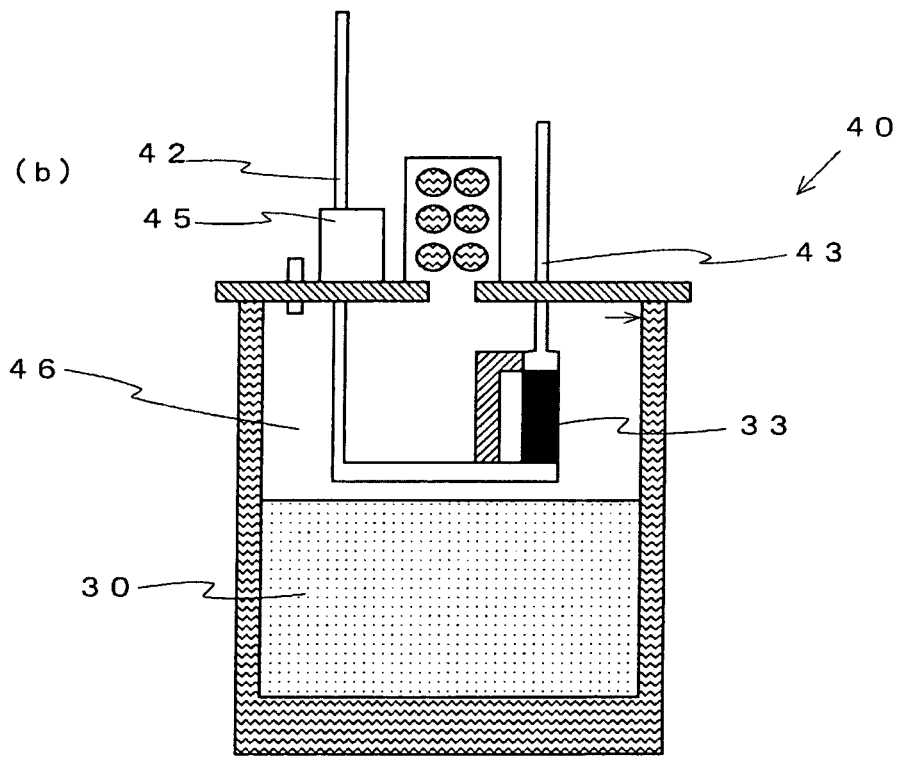

FIG. 11 is a diagrammatic cross-sectional view illustrating the structure of an apparatus for synthesizing carbon nanotubes according to the present invention. The apparatus of the present invention is to supplement the conventional solid-liquid interfacial contact cracking apparatus shown in FIG. 18 with a means for taking the substrate out of the organic liquid into a gaseous atmosphere in a predetermined time period. Therefore, in the Figure, common components in FIG. 18 are designated with like reference numerals and their repeated explanations are omitted.

The carbon nanotube synthesizing apparatus 40 of the present invention has a conductive substrate 33 held fast and, for flowing current through the substrate 33, is provided with an electrode 42 and an electrodes 43 which are clamped together by means of an insulating clamping member 44. A vertical part of the electrode 42 is connected to an electrode moving part 45 disposed on the cover 39. The electrode moving part 45 is functioned to move the electrode 42 at a desired speed and, as illustrated, vertically. The electrode moving part 45 may be provided at least, e.g., with a pulse motor and a gear assembly for converting a rotation of the pulse motor to a vertical movement of the electrode 42 wherein the interval between pulses applied to the pulse motor are controlled to move the electrode 42 at a desired speed vertically. The electrodes 42 and 43 have their lengths such that when removed together with the substrate 33 as shown in FIG. 11(b), they are hung. Also, the liquid tank 31 as shown in FIGS. 11(a) and 11(b) is here configured so that the electrodes 42 and 43 and the substrate 33 can be completely immersed in and completely removed from the organic liquid 30. The electrode moving part 45 preferably has its electrode movement speed controllable in a range such that in the case of alcohol as the organic liquid 30 it takes 10 seconds or less to change from a state of FIG. 11(a) to that of FIG. 11(b).

A carbon nanotube synthesizing method of the present invention using the synthesis apparatus of the present invention will be mentioned next. In this connection, note that the method of the present invention is identical to the conventional solid-liquid interfacial contact cracking method described in Patent Reference 1 except for the slow cooling step and its detailed explanation is therefore omitted.

Figure 12:
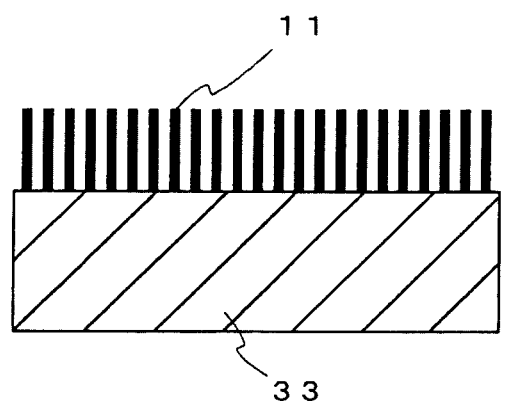
FIG. 12 diagrammatically illustrates states of orientation of carbon nanotubes, (a) shows they are oriented perpendicular to the substrate surface and (b) shows their orientations are disordered.
Figure 12:
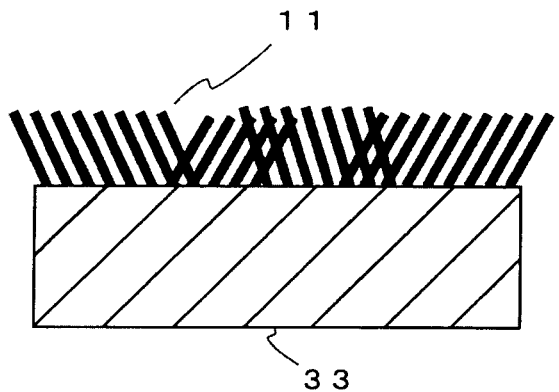

FIG. 12 diagrammatically illustrates states of orientation of carbon nanotubes 11. (a) shows that carbon nanotubes are oriented perpendicular to the substrate 33 surface and (b) shows that orientations of carbon nanotubes are disordered.

A thin film of transition metal such as Fe, Co or Ni is deposited onto a conductive silicon or diamond substrate. The substrate is exposed to hydrogen plasma or the thin film of transition metal is thermally oxidized to cause fine particles of catalyst to be carried on and distributed at a high density on the substrate. The substrate 33 is held fast between the electrodes 42 and 43 and immersed in the organic liquid 30 as shown in FIG. 11(a) and a current is flown between the electrodes 42 and 43 to heat for a predetermined time period the substrate 33 at a temperature such that the synthetic reaction is taken place.

In terminating the synthetic reaction, one of three alternative slow cooling steps stated below can be adopted.

At first, a first possible slow cooling step will be explained.

With the current between the electrodes 42 and 43 cut off, in a predetermined time period thereafter the electrode moving part 45 is driven to remove the electrodes 42 and 43 and the substrate 33 held by the electrodes 42 and 43 from the organic liquid 30 and to maintain them in a gaseous atmosphere 46 of the organic liquid as shown in FIG. 11(b) until the substrate is cooled to a temperature of 100° C. or less. The predetermined time period is preferably 10 seconds or less in the case of alcohol as the organic liquid. If it is 10 seconds or less, then carbon nanotubes which are oriented perpendicular to the substrate as shown in FIG. 12(a) can be obtained reproducibly. If it exceeds 10 seconds, then carbon nanotubes oriented perpendicular to the substrate is not obtainable reproducibly but at one of several times carbon nanotubes disorderly oriented as shown in FIG. 12(b) are synthesized.

Next, a second possible slow cooling step will be explained.

As shown in FIG. 11(b), with the electrode moving part 45 driven to remove the electrodes 42 and 43 and the substrate 33 retained by the electrodes 42 and 43 from the organic liquid 30 and to place them in a gaseous atmosphere 46 of the organic liquid. In a predetermined time period thereafter, the current between the electrodes 42 and 43 is switched off and the substrate is maintained as it is until the substrate is cooled to a temperature of 100° C. or less. The predetermined time period is preferably 10 seconds or less in the case of alcohol as the organic liquid. If it is 10 seconds or less, then carbon nanotubes 11 which are oriented perpendicular to the substrate as shown in FIG. 12(a) can be obtained reproducibly. If it exceeds 10 seconds, then carbon nanotubes oriented perpendicular to the substrate is not obtainable reproducibly but at one of several times carbon nanotubes 11 disorderly oriented as shown in FIG. 12(b) are synthesized.

Next, a third possible slow cooling step will be explained.

As is shown in FIG. 12(b), with the electrode moving part 45 driven to remove the electrodes 42 and 43 and the substrate 33 retained by the electrodes 42 and 43 from the organic liquid 30 and to place them in a gaseous atmosphere 46 of the organic liquid, in a predetermined time period thereafter the current between the electrodes 42 and 43 is decreased gradually and cut off. The predetermined time period is preferably 10 seconds or less in the case of alcohol as the organic liquid. If it is 10 seconds or less, then carbon nanotubes 11 which are oriented perpendicular to the substrate as shown in FIG. 12(a) can be obtained reproducibly. If it exceeds 10 seconds, then carbon nanotubes oriented perpendicular to the substrate are not obtained reproducibly but at one of several times carbon nanotubes 11 disorderly oriented as shown in FIG. 11(b) are synthesized.

An electron emission device according to the present invention will be mentioned next.

Figure 13:
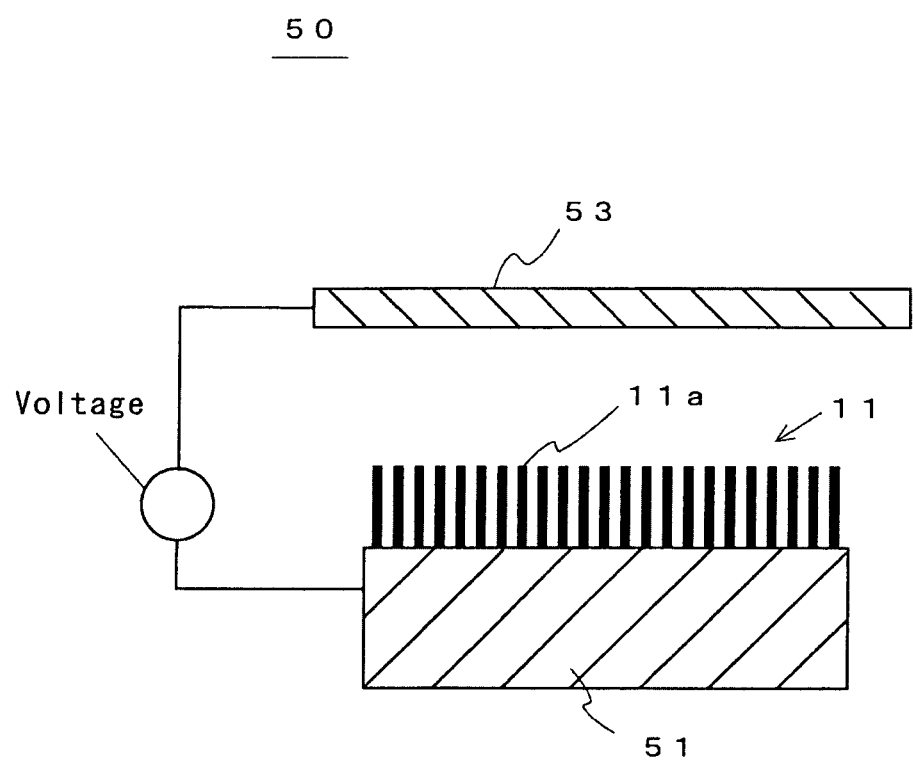
FIG. 13 is a diagram illustrating the structure of an electron emission device according to the present invention.

FIG. 13 is a diagram illustrating the structure of an electron emission device according to the present invention. The electron emission device according to the present invention 50, comprises carbon nanotubes 11 synthesized on a conductive substrate 51 in accordance with the method of the present invention and an anode electrode 53 provided above the carbon nanotubes 11 wherein applying an electric voltage between the conductive substrate 51 and the anode electrode 53 causes electrons to be emitted from apical ends 11a of the carbon nanotubes 11. According to this structure, since the carbon nanotubes 11 are oriented perpendicular to a surface of the conductive substrate 51, the electron emission efficiency is high.

EXAMPLE 4

Example 4 will be mentioned below.

Initially, a thin film of cobalt of 5 nm thick was deposited on a conductive silicon substrate by sputtering a cobalt target with a discharge current of 35 mA for 3 minutes in an argon (Ar) atmosphere of 7 Pa.

Next, the substrate was thermally oxidized to make a conductive silicon substrate having ultra-fine particles of cobalt oxide carried thereon. The thermal oxidation condition were 900° C., 15 minutes by electrical current conduction in the atmosphere of air. This step of thermal oxidation is carried out in a way as mentioned above in connection with FIG. 2. The invention is characterized in that in making densely aligned and highly oriented carbon nanotubes, a cobalt thin film deposited on a silicon or diamond base substrate or a cobalt thin film deposited on a substrate comprising a glass, semiconductor, metal or oxide substrate and a silicon or diamond film formed thereon is thermally oxidized to a degree of oxidation such that the binding energy for a core electron in cobalt of the cobalt thin film is shifted positively in a range of 1 eV to 3 eV; it is thermally oxidized in air at a temperature ranging between 800° C. and 1000° C. for a time period ranging between 5 minutes and 20 minutes.

In this thermal oxidation step, ultra-fine particles of cobalt oxide which are extremely small in particle size are formed and uniformly distributed on the substrate surface and, with oxidized cobalt weakening its reactivity with silicon, they are inhibited from coalescing together on the silicon surface and from sinking in the silicon substrate. Hence, there result densely aligned and highly oriented carbon nanotubes. Also, in this thermal oxidation step the degree of oxidation of cobalt is so apt that it retains its catalytic activity in cobalt oxide in the form of ultra-fine particles and sufficient to bring about a reaction to synthesize carbon nanotubes.

Next, carbon nanotubes were synthesized according to the method of the present invention with the first cooling step, using the synthesis apparatus shown in FIG. 11. Conditions for synthesis are shown below.

Source organic liquid: methanol (purity of 99.9% and boiling point of 64.7° C.);

Carbon nanotube synthesis conditions: substrate temperature of 600° C. and synthesis time period of 5 minutes; and Slow cooling step conditions: In 10 minutes after the current cutoff, the substrate was removed from the organic liquid and held in gaseous atmosphere of the organic liquid for 30 minutes.

For comparison with the conventional method, a comparative specimen was also prepared which was under the same carbon nanotube synthesis conditions above but was held in the organic liquid until it was cooled down to the methanol boiling point. The tests were repeated several times.

Figure 14:
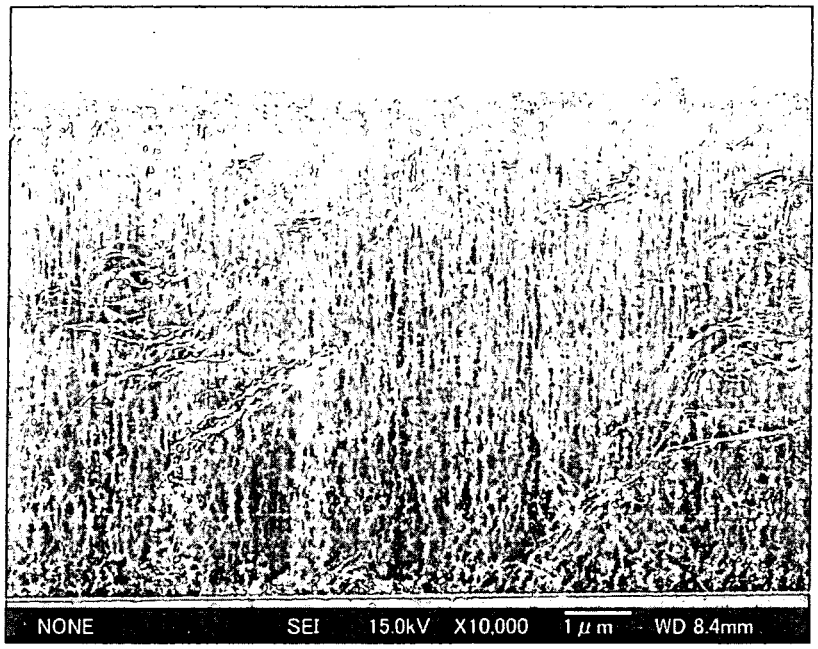
FIG. 14 illustrates SEM images of carbon nanotubes synthesized in Example 4 of the present invention, (a) shows a SEM image of carbon nanotubes oriented perpendicular to the substrate surface and (b) shows a SEM image of carbon nanotubes whose orientations are disordered.
Figure 14:
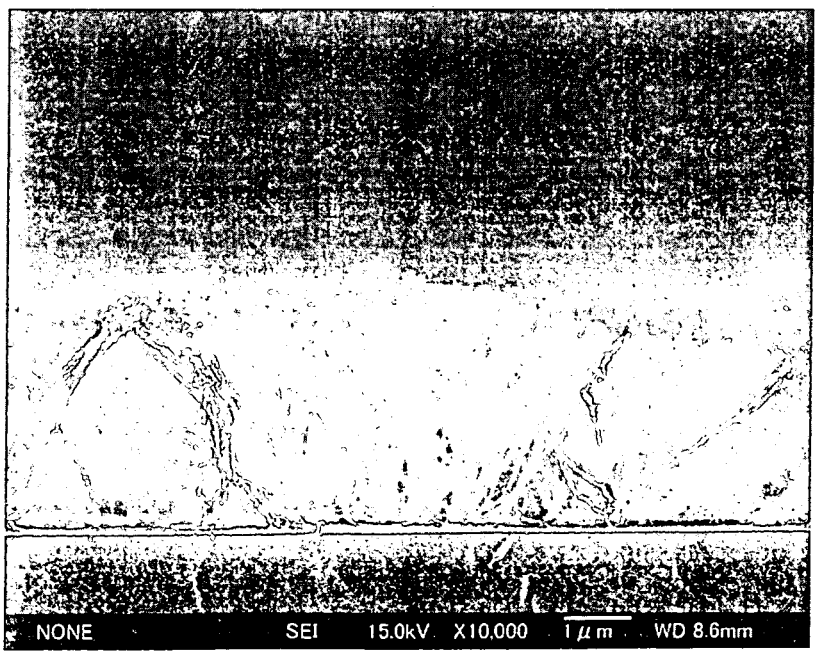

FIG. 14 illustrates SEM images of carbon nanotubes synthesized in Example 4 of the present invention, (a) shows a SEM image of carbon nanotubes oriented perpendicular to the substrate surface and (b) shows a SEM image of carbon nanotubes whose orientation is disordered.

All the specimens which were repeatedly made according to the method of the present invention showed a SEM image of (a) while the specimens made according to the conventional method included ones showing a SEM image of (b). It is thus shown that carbon nanotubes which are oriented perpendicular to the substrate can be synthesized reproducibly according to the method of the present invention.

An electron emission device of the present invention will be mentioned.

Figure 15:
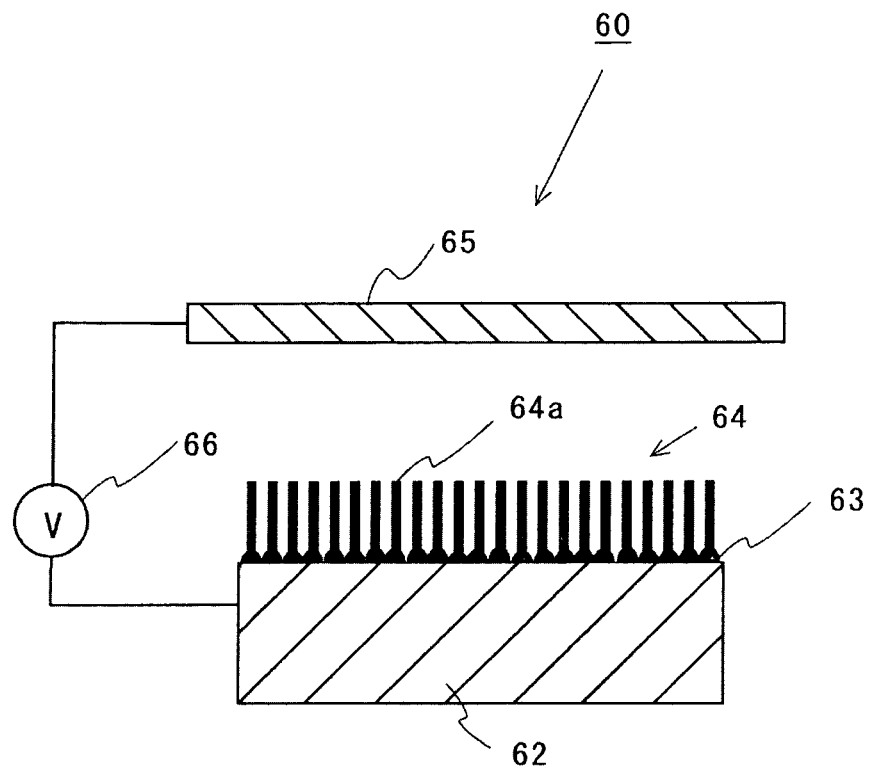
FIG. 15 is a diagrammatic view illustrating an electron emission device according to the present invention.

FIG. 15 is a diagrammatic view illustrating the structure of an electron emission device according to the present invention. The electron emission device of the present invention 60 as shown in FIG. 15 comprises a conductive substrate 62, fine particles 63 of catalyst formed on the conductive substrate 62, carbon nanotubes 64 formed on the fine catalyst particles 63 and perpendicular to the conductive substrate 62 and an anode electrode 65 disposed above the carbon nanotubes 64. Between the conductive substrate 62 and the anode electrode 65, there is interposed a spacer of insulating material not shown to maintain a constant spacing between the conductive substrate 62 and the anode electrode 65. In the electron emission device 60, a voltage from a power supply 6 is applied between the conductive substrate 62 and the anode electrode 65 to cause electrons to be emitted from apical ends 64a of the carbon nanotubes 64.

The conductive substrate 62 if composed of a single material is preferably a conductive silicon or conductive diamond substrate. The conductive substrate 62 is more preferably made of a conductive silicon.

Figure 16:
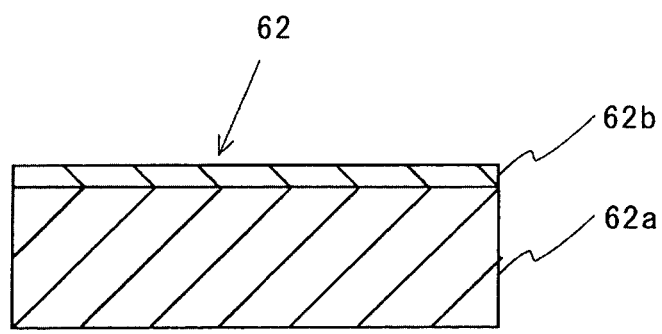
FIG. 16 is a diagrammatic cross-sectional view illustrating a conductive substrate composed of a plurality of materials.

FIG. 16 is a diagrammatic view illustrating a conductive substrate composed of a plurality of materials. As shown, the conductive substrate 62 composed of a plurality of materials has a conductive film 62b formed on a substrate 62a. As the substrate 62a, a glass, semiconductor, oxide or metal substrate can be used. As the conductive film 62b, a silicon or diamond film may be used. The diamond film may be of any diamond material such as polycrystalline diamond, nanocrystalline diamond, diamond-like carbon or single crystalline diamond. If a diamond film is used, a hybridized orbital as a mixture of $sp^2$ hybridized orbital of carbon nanotube and $sp^3$ hybridized orbital of diamond is formed at a carbon to carbon junction area between carbon nanotubes and substrate, firmly bonding carbon nanotubes to the substrate.

A polycrystalline diamond, nanocrystalline diamond, diamond-like carbon or single crystalline diamond film can be synthesized on a glass, semiconductor, metal or oxide substrate by chemical vapor deposition or plasma chemical vapor deposition using hydrogen and hydrocarbon as source gases (See Non-patent reference 1.).

The fine catalyst particles can be constituted by ultra-fine particles of cobalt oxide. Ultra-fine cobalt oxide particles preferably have a particle size of 10 nm or less. Such ultra-fine cobalt oxide particles are obtainable, preferably by a process of thermal oxidation to be described later. According to the process of thermal oxidation, ultra-fine cobalt oxide particles extremely small in particle size can be produced as evenly distributed on a surface of the conductive substrate 62 and cobalt by being oxidized becomes less reactive with a conductive substrate 62. As a result, ultra-fine particles of cobalt oxide evenly distributed on the surface of the conductive substrate 62 are inhibited from agglomerating together and from sinking into the conductive substrate 62, and densely aligned and highly oriented carbon nanotubes are thereby obtained.

Carbon nanotubes 64 have a feature that they can be synthesized by the solid-liquid interfacial contact cracking method to be described yet of the present invention and they are extremely high in crystal quality without containing any carbonaceous products such as amorphous carbon. As a criterion to show a high crystalline perfection of the carbon nanotubes 64, it can be cited that in their Raman scattering spectrum they have a highest Raman scattering intensity in the vicinity of 1580 $cm^{-1}$. This Raman scattering in the vicinity of 1580 $cm^{-1}$ is that based on lattice vibrations of a lattice composed of $sp^2$ hybridized orbital of carbon. The higher the Raman scattering intensity in the vicinity of 1580 $cm^{-1}$, the higher is the perfection of the lattice based on the $sp^2$ hybridized orbital of carbon. Namely, it is shown that there are little disorder of periodicity of carbon lattices and only a small number of carbon vacancies in the Graphene sheets that constitute carbon nanotubes 64.

In the Raman scattering spectrum of carbon nanotubes 64 of the present invention, the Raman scattering intensity in the vicinity of 1580 $cm^{-1}$ is more than twice as high as the Raman scattering intensity in the vicinity of 1350 $cm^{-1}$. Carbon nanotubes 64 that satisfy this relationship are higher in crystal quality than those in the prior art with a consequential rise in electron emission efficiency of the electron emission device 60 with such carbon nanotubes 64.

According to the electron emission device 60, its drive voltage can be reduced to obtain a current value that is sufficient to emit a fluorescent material on the market for slow electrons. Moreover, the electron emission device 60 needs no gate and can thus simplify the structure and reduce the cost of a surface light-emitting device for which the device is used. The carbon material remains unoxidized even in a low vacuum and thus allows realizing a light emitting device that can be paneled more easily, and is longer in operating life, than one with the conventional electron emission device used.

A method of making an electron emission device 60 of the present invention will be mentioned next. The method of making an electron emitting 1 comprises the following steps:

A first step, a cobalt thin film is formed on a conductive substrate 62 and is then thermally oxidized to make a carbon nanotube synthesizing substrate;

A second step, carbon nanotubes 64 are synthesized onto the carbon nanotube synthesizing substrate by solid-liquid interfacial contact cracking in an organic liquid of alcohol in which they are synthesized on the substrate at a low temperature in a first synthesis process and at a high temperature in a second synthesis process; and A third step, the carbon nanotube synthesizing substrate is slowly cooled in terminating the second step.

The first step will be explained by referencing FIG. 2.

As shown in FIG. 2(a), a thin film of cobalt 7 is deposited onto a conductive substrate 2. Any known film forming method such as vacuum deposition, CVD (chemical vapor deposition) or sputtering may be used. The film thickness is possibly several tens nm but preferably not more than 10 nm if carbon nanotubes are to be synthesized aligned densely.

As shown in FIG. 2(b), thermal oxidation treatment of the conductive substrate 2 having the cobalt thin film 7 formed thereon in air at a predetermined temperature and for a predetermined time period selected causes ultra-fine particles of cobalt oxide 3 having substantially an identical particle size to be formed on and distributed substantially uniformly over the conductive substrate 2. The thermal oxidation treatment may be performed in an oxidizing atmosphere if it is not air. In the case of a cobalt thin film 7 having a thickness of not more than about 10 nm and if the thermal oxidation is performed in air atmosphere, the treatment temperature is preferably between 800 and 1000° C. and the treatment time period is preferably between 5 and 20 minutes. Controlling the treatment temperature and time period so allows the cobalt thin film 7 to be oxidized to form ultra-fine particles of cobalt oxide 3. The ultra-fine cobalt oxide particles 3 should preferably have a degree of oxidation such that when measured by X-ray photoelectron spectroscopy, the binding energy of core electrons in cobalt is shifted positively by a range of 1 eV to 3 eV. If the degree of oxidation is so low that the shift of binding energy is less than 1 eV, then variations in radius and distribution of carbon nanotubes are liable to occur, preventing reproducible synthesis of densely aligned and highly oriented carbon nanotubes. Conversely, if the degree of oxidation is so high that the shift of binding energy is more than 3 eV, then the ultra-fine particles of cobalt oxide 3 lose their catalytic activity so that carbon nanotubes may not grow.

While ultra-fine particles of cobalt oxide are shown in FIG. 2 as formed on a conductive substrate 2 composed of a single material. In the case of a conductive substrate 62 made up of a plurality of materials as shown in FIG. 16, after a cobalt film is formed as the conductive film 62b, it may be treated so as to be thermally oxidized. Then, in a manner as in FIG. 2(b), ultra-fine particles of cobalt oxide 63 can be formed on the conductive film 62b. Following the method mentioned above, a carbon nanotube synthesizing substrate can be obtained.

The second and third steps with reference to FIG. 11 will be explained next.

As shown in FIG. 11(a), when synthesizing carbon nanotubes 64 a carbon nanotube synthesizing substrate 33 is inserted into the organic liquid 30. When the synthesis is completed, as shown in FIG. 11(b), the carbon nanotube synthesizing substrate 33 is withdrawn from the organic liquid 30 and moved into a gaseous atmosphere 46 by the electrode moving equipment 45. The electrodes 42 and 43 as shown in FIG. 11(b) have their lengths such that they, together with the carbon nanotube synthesizing substrate 33, can be removed from the organic liquid 30 and then hung down. The liquid tank 31 as shown in FIGS. 11(a) and 11(b) is here configured so that the carbon nanotube synthesizing substrate 33 held by the electrodes 42 and 43 can be completely immersed in and completely removed from the organic liquid 30. The electrode moving part 45 preferably have their electrode movements speed controllable in a range such that in the case of alcohol as the organic liquid 30 it takes 10 seconds or less to change from a state of FIG. 11(a) to that of FIG. 11(b).

In the second step, initially the liquid tank 31 is loaded with an organic liquid 30 of alcohol in an amount such that the carbon nanotube synthesizing substrate 33 can be immersed in the organic liquid 30. The carbon nanotube synthesizing substrate 33 is clamped on the electrodes 42 and 43 and left immersed completely in the organic liquid 30 as shown in FIG. 11(a).

At this point, an electric current is flown through the carbon nanotube synthesizing substrate 33 via the electrodes 42 and 43 to heat the substrate at a temperature of the first synthesis process for a predetermined time period and thereby to perform a first synthesis of carbon nanotubes. The substrate temperature then is preferably set in a range between 500° C. and 700° C. If the substrate temperature exceeds 700° C., it is undesirably that particulate carbon nanotubes grow.

While the first synthesis process does not yield carbon nanotubes sufficient in crystal quality and is desirably as short as possible and preferably between 10 seconds and 3 minutes. A synthesis time period of 10 seconds or more in the first synthesis process makes it possible for carbon nanotubes 64 grown in the first synthesis process to continue to be grown by the second synthesis process. If it is less than 10 seconds, carbon nanotubes grown in the first synthesis process cannot be continued to grow by the second synthesis process. Carbon nanotubes grown in the first synthesis process that has low crystal quality needs to be brought through the second synthesis process to raise their crystal quality.

Next, the electric current flown through the carbon nanotube synthesizing substrate 33 is altered to heat the substrate to temperature of the second synthesis process to cause the carbon nanotubes 64 grown in the first synthesis process to continue to grow. Then, the substrate temperature is preferably set in a range between 750° C. and 1100° C. If it is lower than 750° C., carbon nanotubes synthesized will then has low crystal quality. Conversely, if it exceeds 1100° C., then carbon nanotubes continued to grow will not be oriented perpendicular to the substrate. The longer the time period in which the second synthesis process is performed the larger will be the length and radius of carbon nanotubes 64 in proportion to the time period in which it is carried out. The time period in which the second synthesis process is carried out is set according to a length and radius of carbon nanotubes 64 as desired.

The effect of setting different substrate temperatures in two divided stages to synthesize carbon nanotubes will be explained with reference to FIG. 7. As shown in FIG. 7(a), setting different substrate temperatures in two divided stages to synthesize carbon nanotubes grows fibrous carbon nanotubes 13 which are oriented perpendicular to the carbon nanotube synthesizing substrate 33. The carbon nanotubes so grown have high crystal quality (See FIG. 7(d).). On the other hand, when carbon nanotubes were synthesized by the conventional method, particulate carbon nanotubes 14 were grown and had a low crystal quality (See FIG. 7(c).).

In the third step, the carbon nanotube synthesis substrate 33 is slowly cooled in terminating the synthesis of carbon nanotubes. Three alternative slow cooling ways stated below can be adopted.

A first possible way is initially mentioned.

With the current between the electrodes 42 and 43 cut off in a predetermined time period thereafter, the electrode moving part 45 is driven to remove the electrodes 42 and 43 and the carbon nanotube synthesizing substrate 33 held by the electrodes 42 and 43 from the organic liquid 30 and to maintain them in a gaseous atmosphere 46 of the organic liquid until the substrate is cooled to a temperature of 100° C. or lower.

A second possible way is mentioned next.

The electrode moving part 45 is driven to remove the electrodes 42 and 43 and the carbon nanotube synthesizing substrate 33 retained by the electrodes 42 and 43 from the organic liquid and to place them in a gaseous atmosphere 26 of the organic liquid in a predetermined time period. Thereafter, the current between the electrodes 42 and 43 is cut off and the substrate is maintained as it is until the substrate is cooled to a temperature of 100° C. or lower.

A third possible way is mentioned next.

The electrode moving part 45 is driven to remove the electrodes 42 and 43 and the carbon nanotube synthesizing substrate 33 retained by the electrodes 42 and 43 from the organic liquid 30 and to place them in a gaseous atmosphere 46 of the organic liquid in a predetermined time period. Thereafter, the current between the electrodes 42 and 43 is diminished gradually and then cut off.

Whichever of the ways mentioned above is adopted, the predetermined time period before the carbon nanotube synthesizing substrate 33 is removed from the organic liquid 30 is preferably 10 seconds or less in the case of alcohol as the organic liquid. If it exceeds 10 seconds, then carbon nanotubes oriented perpendicular to the substrate cannot be obtained reproducibly.

The effect of slow cooling in the third step is mentioned with reference to FIG. 12. The FIG. 12 diagrammatically illustrates states of orientation of carbon nanotubes 11 formed on a carbon nanotube synthesizing substrate 33, (a) shows the alignment state of the carbon nanotubes in case of slow cooling step and (b) shows the alignment state of the carbon nanotubes 11 without slow cooling step.

As shown in FIG. 12(a), the slow cooling step allows carbon nanotubes 11, which are oriented perpendicular to the carbon nanotube synthesizing substrate 33, to be reproducibly obtained. On the other hand, if the slow cooling step is omitted, it is not preferable that carbon nanotubes 11 are then undesirably synthesized which at one of several times are disordered in orientation as shown in FIG. 12(b).

Slow cooling in the third step keeps the carbon nanotube synthesizing substrate 33 and the carbon nanotubes 11 close to their equilibrium state, preventing development of large temperature difference between the carbon nanotube synthesizing substrate 33 and the carbon nanotubes 11 and thus preventing development of large difference in thermal shrinkage between the carbon nanotube synthesizing substrate 33 and the carbon nanotubes 11.

Thus, since the orientation of the carbon nanotubes 11, which were grown perpendicular to the carbon nanotube synthesizing substrate 33, remain unaltered, the severe thermal stress is prevented from occurring between the carbon nanotube synthesizing substrate 33 and the carbon nanotubes 11. As a result, the carbon nanotubes 11 are prevented from coming off, and thus can be made hard to peel off from the carbon nanotube synthesizing substrate 33.

According to the manufacturing method of the present invention, the use of solid-liquid interfacial contact cracking allows manufacturing carbon nanotubes of high purity. Also, by controlling cobalt catalytic state, introducing a multistage process and slow cooling process, it is possible to manufacture densely aligned and highly oriented carbon nanotubes having high crystal quality at a very high yield

EXAMPLE 5

Explanations are given of further details of the electron emission device and the method of its making according to the present invention with respect to an example thereof.

In the first step, an n-type Si (100) surface substrate (a specific resistance of 0.0026 Ω·cm and a size of 7 mm×22 mm×0.5 mm) was used as the conductive substrate 62 and carbon nanotubes were synthesized by the following steps below.

At first, a cobalt thin film 11 of 5 nm thick was deposited onto the conductive substrate 62 by sputtering a cobalt target with a discharge current of 35 mA in an argon (Ar) atmosphere of 7 Pa (Pascal). The substrate 62 was then thermally oxidized in air at 900° C. for 10 minutes to make a carbon nanotube synthesizing substrate 33.

Next, using the synthesis apparatus as shown in FIG. 11, carbon nanotubes 64 were synthesized. For the organic liquid 30 as a source material of carbon nanotubes 64, methanol (a purity of 99.9% and a boiling point of 64.7° C.) was used. An amount of the methanol 30 such that the carbon nanotube synthesizing substrate 33 could just be submerged therein was loaded into the liquid tank 31.

In the second step, the carbon nanotube synthesizing substrate 33 prepared in the first step was clamped on the electrodes 42 and 43 and then submerged in the methanol 30. In the first synthesis process, current was flown between the electrodes 42 and 43 to heat the substrate until its temperature reached 600° C. at which it was maintained for 1 minute. In the second synthesis process, current was flown between the electrodes 42 and 43 to heat the substrate until its temperature reached 900° C. at which it was maintained for 5 minutes.

In the third step, the current flown between the electrodes 42 and 43 was cut off and at 10 seconds thereafter the carbon nanotube synthesizing substrate 33 was removed from the methanol 30 using the electrode moving equipment 45 into methanol gas atmosphere 46 where the substrate 33 was maintained for 30 minutes for slowly cooling the carbon nanotube synthesizing substrate 33.

Carbon nanotubes 64 were synthesized following the steps above. Also, the method of Example 1 was repeated several times to synthesize several sets of carbon nanotubes 4.

Comparative Example 1

Carbon nanotubes were synthesized in the same manner as in Example 5 except that they were at a substrate temperature of 700° C. for a synthesis time period of 6 minutes, without the slow cooling and with the substrate in the organic liquid until it was cooled to the boiling point of methanol.

The cobalt oxide ultra-fine particles 63 formed on the carbon nanotube synthesizing substrate 33 prepared in Example 5 were measured using the XPS (X-ray photoelectron spectroscopy) equipment.

The cobalt oxide ultra-fine particles 63 formed on the carbon nanotube synthesizing substrate 33 prepared in Example 5 had the same X-ray photoelectron spectrum as shown in FIG. 4. As for the cobalt oxide ultra-fine particles 3 of Example 5, it is found that peak P1 for cobalt core electrons whose hybridized total angular momentum is 3/2 where hybridized orbital angular momentum is 2P and peak P2 for cobalt core electrons whose hybridized total angular momentum is 1/2 where hybridized orbital angular momentum is 2P shift positively by about 2 eV and have their peak intensities reduced by thermal oxidation. Although not shown, if the shift in peak is less than 1 eV, then the phenomenon that carbon nanotubes 64 are synthesized fluctuating in radius or reducing in density was likely to occur. Also, while not shown, if the shift in peak exceeds 3 eV, then carbon nanotubes 64 were not synthesized at all.

In the manufacture of carbon nanotubes 64 of Example 5, thermally oxidizing a cobalt thin film 7 at a high temperature of 900° C. resulted in carbon nanotubes 64 in which ultra-fine particles of cobalt oxide 63 extremely small in particle size were formed on a substrate, distributing evenly over its surface as mentioned above. This appears to be due to the fact that the oxidation weakens the reactivity of cobalt and silicon with each other while restraining cobalt oxide ultra-fine particles 63 from agglomerating with one another on the silicon surface or from sinking in the silicon substrate. On the other hand, if the degree of oxidation was excessively high, then the cobalt oxide ultra-fine particles 63 lost their catalytic activity so that no reaction for synthesis of carbon nanotubes 64 was brought about. If the substrate temperature in synthesizing carbon nanotubes 64 exceeded 900° C., then, densely aligned and highly oriented carbon nanotubes 64 could not be synthesized reproducibly. It is considered that this is because at a temperature in excess of 900° C., it is no longer negligible for cobalt oxide and silicon to react with each other and then cobalt oxide ultra-fine particles 63 are likely to coalesce with one another and to sink into the substrate.

Carbon nanotubes 64 synthesized in Example 5 and those in Comparative Example 1 were observed using the scanning electron microscope (SEM). Carbon nanotubes 64 synthesized in Example 5 were confirmed to be carbon nanotubes 64 oriented perpendicular to the substrate surface as shown in FIG. 14. As for specimens made by repetition of a plurality of times, all of them exhibited an aspect of the SEM image of (a). On the other hand, as is apparent from FIG. 14(b), carbon nanotubes 64 synthesized in Comparative Example 1 were found to be carbon nanotubes whose orientation was disordered.

Thus, Example 5 in which the slow cooling step was included in making carbon nanotubes 64 confirmed that not only could carbon nanotubes 64 be obtained which were oriented perpendicular to the substrate 62 surface but also their reproducibility was extremely high in this orientation.

Carbon nanotubes synthesized in Example 5 and those in Comparative Example 1 were evaluated by Raman spectroscopy on their crystal quality completeness. For the measurement, the laser Raman spectrophotometer (made by JASCO corporation; model NR-1800) was used and the Argon (Ar) laser having an output power of 50 mW and with a wavelength of 514.5 nm was used as the excitation light source.

In the Raman spectrum of carbon nanotubes 64 synthesized in Example 5 as same as shown in FIG. 8, it is seen that the intensity of the peak at $1580\ cm^{-1}$ (D band) is higher than that of the peak at $1350\ cm^{-1}$ (G band). It has further been confirmed that the ratio of the peak intensity at $1580\ cm^{-1}$ to the peak intensity at $1350\ cm^{-1}$ is as high as three or more. On the other hand, as for carbon nanotubes synthesized in Comparative Example 1, it has been confirmed that the peak intensity at $1580\ cm^{-1}$ is weak and its ratio to the peak intensity at $1350\ cm^{-1}$ is less than 2.

It has thus been found that carbon nanotubes 64 synthesized in Example 5 is higher in crystal quality than those in Comparative Example 1.

EXAMPLE 6

An electron emission device was made using carbon nanotubes 64 synthesized in Example 5. The electron emission device 60 made in Example 6 was configured that a conductive substrate 62 having carbon nanotubes 64 formed thereon was opposed via a spacer 22, as shown in FIG. 9, to a glass substrate 23 having a transparent electrode (of indium and tin oxide) 23*a* vapor-deposited thereon. The carbon nanotubes 64 had their apical ends spaced from the transparent electrode 23a by a distance g of 100 µm. An area of the carbon nanotubes 64 on the substrate 62 was a square having a side d of 3 mm.

Comparative Example 2

An electron emission device was made in the same manner as in Example 6 except that carbon nanotubes synthesized in Comparative Example 1 was used.

The field emission characteristics of the electron emission device 60 of Example 6 and Comparative Example 2 were evaluated. The voltage is applied between the conductive substrate 62 and the transparent electrode 23a to measure electrical current flown between the substrate 62 and the transparent electrode 23a and thereby measuring the current-voltage characteristics as a function of applied voltage.

Figure 17:
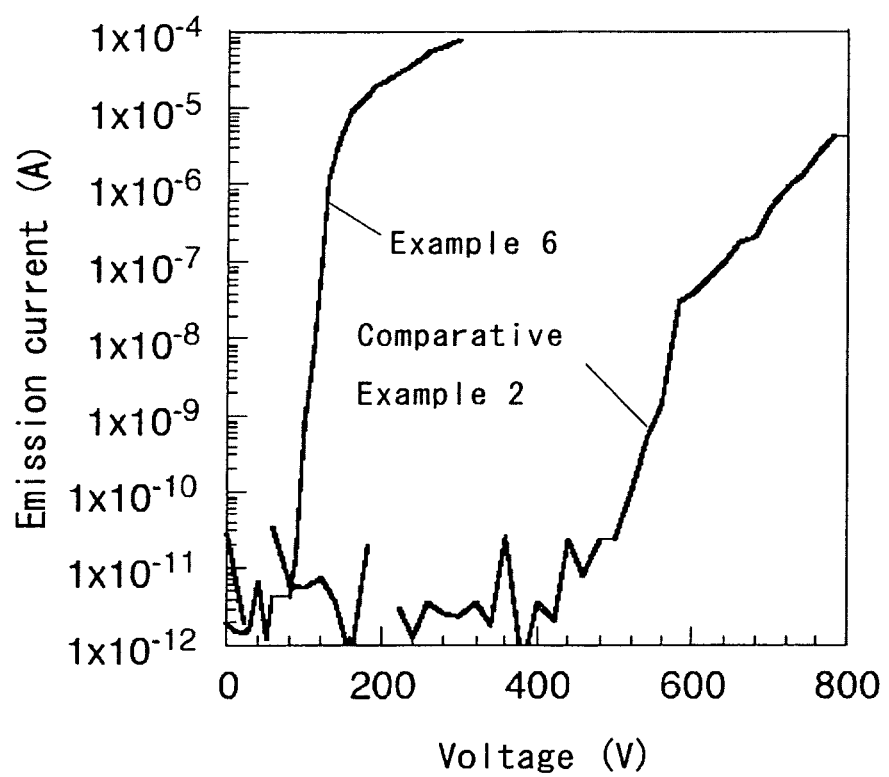
FIG. 17 is a chart illustrating current-voltage characteristics of an electron emission device in Example 6 and that in Comparative Example 2.

FIG. 17 is a chart illustrating current-voltage characteristics of the electron emission device in Example 6 and that in Comparative Example 2. In FIG. 17, the abscissa axis represents the voltage (V) and the ordinate axis represents the current (A). As is apparent from FIG. 17, it has been found that the electron emission device 60 of Example 6 has a sharp rise in discharge current as the applied voltage exceeds 80 V and a discharge current of about 70 µA at an applied voltage 350 V, thus showing a good current-voltage characteristics. This current value is sufficient to emit a fluorescent material on the market for slow electrons. On the other hand, with the electron emission device of Comparative Example 2, no sharp rise in discharge current was brought about unless the applied voltage is more than 500V and at applied voltage as high as 800 V only about one tenth in discharge current of Example 6 could be obtained.

As a similar measuring system as shown in FIG. 17, the conventional electron emission device having a diode structure without a gate (extractor) electrode required 5 kV (80V in Example 5) as a rise voltage. As a comparison with this, driving voltage of the electron emission device of Example 6 is markedly lower. Also, a current level as high as 50 µA or higher has been obtained. This current value is sufficient to emit a fluorescent material on the market for slow electrons. Moreover, this electron emission device requires no gate electrode and can thus simplify the structure and reduce the cost of a surface light-emitting device for which the device is used. The carbon material remains unoxidized even in a low vacuum and thus allows realizing a light emitting device that can be paneled more easily, and is longer in operating life than those using a conventional field emitter. It has been confirmed that the electron emission device 60 of Example 6 realizes a markedly lower driving voltage than that of Comparative Example 2, also makes larger current obtainable and has the extremely high in electron emission characteristics.

INDUSTRIAL APPLICABILITY

As will be appreciated from the foregoing description, densely aligned and highly oriented carbon nanotubes of the present invention are unprecedentedly high in density of carbon nanotubes and of low cost. Since the carbon nanotubes have the high crystal quality and their electron emission efficiency is high, the carbon nanotubes are useful if used as the material of an electron emission device. Since the carbon nanotubes has the high crystal quality, they can reveal the mechanical strength that is intrinsic to $sp^2$ hybridized orbit of carbon and hence are extremely useful if used as the material of the reinforcement for the mechanical strength.

According to the present invention, the substrate with carbon nanotubes which are high in orientation, density and crystal quality as well as the electron emission device using the same can be provided. Since the electron emission device of the present invention has a form commonly used in various technical fields, they can serve in varieties of applied researches and commercialization studies requiring carbon nanotubes and are thus expected to promote such researches and studies.

It is thus possible to improve at low cost not only the electron emission device but also devices such as an electrode of a double layer capacitor and an electrode of a fuel cell using densely aligned and highly oriented carbon nanotubes.

The use of a densely aligned and highly oriented carbon nanotube synthesizing substrate of the present invention allows reproducibly synthesizing densely aligned and highly oriented carbon nanotubes which are oriented perpendicular to the surface of the substrate and aligned at an unprecedentedly high density. Using a densely aligned and highly oriented carbon nanotube synthesizing substrate making method of the present invention allows obtaining a substrate with densely aligned and highly oriented carbon nanotubes. Using a densely aligned and highly oriented carbon nanotube synthesizing substrate of the present invention and a densely aligned and highly oriented carbon nanotube synthesizing method of the present invention allows reproducibly synthesizing densely aligned and highly oriented carbon nanotubes which are oriented perpendicular to the surface of the substrate and aligned at an unprecedentedly high density and a substrate with such densely aligned and highly oriented carbon nanotubes.

What is claimed is:

1. A method of synthesizing carbon nanotubes, comprising:
    forming a catalyst composed of a transition metal or a catalyst composed of a transition metal oxide on a substrate; and
    synthesizing carbon nanotubes on said substrate by solid-liquid interfacial contact cracking method by heating said substrate having said catalyst formed thereon to synthesizing temperatures in an organic liquid of alcohol,
    wherein the step of synthesizing includes:
    a first synthesis process in which carbon nanotubes are synthesized at a low substrate temperature; and
    a second synthesis process after the first synthesis process in which carbon nanotubes are synthesized at a high substrate temperature, and
    wherein said first synthesis process grows carbon nanotubes oriented perpendicular to the surface of said substrate, and said second synthesis process grows carbon nanotubes continuously form the carbon nanotubes grown in said first synthesis process.

2. The method of synthesizing carbon nanotubes as set forth in claim 1, wherein said first synthesis process is performed at a substrate temperature of 500° C. to 700° C.

3. The method of synthesizing carbon nanotubes as set forth in claim 1, wherein said second synthesis process is performed at a substrate temperature of 750° C. to 1100° C.

4. The method of synthesizing carbon nanotubes as set forth in claim 1, wherein said first synthesis process is carried out for a synthesis time period of not less than 10 seconds.

* * * * *